(12) United States Patent
Gallagher et al.

(10) Patent No.: US 7,845,688 B2
(45) Date of Patent: Dec. 7, 2010

(54) MULTIPLE MATERIAL PIPING COMPONENT

(75) Inventors: James E. Gallagher, Kingwood, TX (US); Michael D. Gallagher, Kingwood, TX (US)

(73) Assignee: Savant Measurement Corporation, Kingwood, TX (US)

( * ) Notice: Subject to any disclaimer, the term of this patent is extended or adjusted under 35 U.S.C. 154(b) by 642 days.

(21) Appl. No.: 11/732,622

(22) Filed: Apr. 4, 2007

(65) Prior Publication Data

US 2008/0246277 A1     Oct. 9, 2008

(51) Int. Cl.
F15D 1/04     (2006.01)

(52) U.S. Cl. .......................... 285/412; 138/44
(58) Field of Classification Search ............ 285/55, 285/412, 368; 138/39, 42, 44, 41
See application file for complete search history.

(56) References Cited

U.S. PATENT DOCUMENTS

| | | |
|---|---|---|
| 985,216 A | 2/1911 | Sims |
| 1,448,151 A | 3/1923 | Reeves |
| 1,473,349 A | 11/1923 | Kach |
| 1,759,239 A | 5/1930 | Morrison |
| 1,980,672 A | 11/1934 | Engel |
| 2,325,036 A | 7/1943 | Case |
| 2,391,110 A | 12/1945 | Walker |
| 2,550,725 A | 5/1951 | Schultz |
| 2,600,733 A | 6/1952 | Clift |
| 2,688,985 A | 9/1954 | Holdenried |
| 2,803,962 A | 8/1957 | West |
| 2,842,962 A | 7/1958 | Dall |
| 2,864,588 A | 12/1958 | Booth et al. |
| 2,896,668 A | 7/1959 | Aitken |
| 2,924,441 A | 2/1960 | Osborne |
| 2,927,462 A | 3/1960 | Li |

(Continued)

FOREIGN PATENT DOCUMENTS

CA     2138686     8/1995

(Continued)

OTHER PUBLICATIONS

Terrence A. Grimley, Paper 19: Performance Testing of Ultrasonic Flow Meters, 1997 North Sea Flow Measurement Workshop, Organizer: Norwegian Society of Chartered Engineers et al (22 pages).

(Continued)

*Primary Examiner*—David E Bochna
(74) *Attorney, Agent, or Firm*—Strasburger & Price

(57) ABSTRACT

The piping component is comprised in part of a metal housing that is positionable with a metal pipe. The metal housing forms an opening in which a piping component body is inserted. The body of the piping component can be fastened to the metal housing using an epoxy adhesive, a set screw connection, a threaded connection, press fit connection, a key connection or a pin connection or a combination of these connections. The body is comprised of plastic, which is less expensive than metal and facilitates forming, including machining or molding, while maintaining its structural integrity in a hostile fluid environment, such as in oil or gas. Piping components such as flowmeters, flow conditioners, small volume provers, static mixers, samplers, and valves are contemplated for use with these multiple materials.

20 Claims, 13 Drawing Sheets

U.S. PATENT DOCUMENTS

| | | | |
|---|---|---|---|
| 2,929,248 A | 3/1960 | Sprenkle | |
| 2,998,860 A | 9/1961 | Everett | |
| 3,020,592 A | 2/1962 | MacCaferri | |
| 3,105,570 A | 10/1963 | Bezemes | |
| 3,170,483 A | 2/1965 | Milroy | |
| 3,182,965 A * | 5/1965 | Sluijters | 366/340 |
| 3,191,630 A | 6/1965 | Demyan | |
| 3,235,003 A | 2/1966 | Smith | |
| 3,250,469 A | 5/1966 | Colston | |
| 3,280,807 A | 10/1966 | Bardy | |
| 3,291,670 A | 12/1966 | Usab | |
| 3,393,767 A | 7/1968 | Monk | |
| 3,421,360 A | 1/1969 | Luse et al. | |
| 3,545,492 A * | 12/1970 | Scheid, Jr. | 138/42 |
| 3,561,728 A | 2/1971 | Clarke et al. | |
| 3,564,912 A | 2/1971 | Malone et al. | |
| 3,568,723 A | 3/1971 | Sowards | |
| 3,572,391 A | 3/1971 | Hirsch | |
| 3,582,048 A * | 6/1971 | Sarem | 366/340 |
| 3,590,946 A | 7/1971 | Corn, Jr. | |
| 3,645,298 A | 2/1972 | Roberts et al. | |
| 3,673,851 A | 7/1972 | Wright et al. | |
| 3,710,942 A | 1/1973 | Rosenberg | |
| 3,715,870 A | 2/1973 | Guzick | |
| 3,733,898 A | 5/1973 | Yamamoto et al. | |
| 3,747,641 A | 7/1973 | Hare et al. | |
| 3,778,083 A | 12/1973 | Hamasaki | |
| 3,780,758 A | 12/1973 | DeVries | |
| 3,796,231 A | 3/1974 | Hare | |
| 3,798,345 A | 3/1974 | Priaroggin et al. | |
| 3,798,968 A * | 3/1974 | Harris | 73/861.92 |
| 3,838,598 A | 10/1974 | Tompkins | |
| 3,840,051 A | 10/1974 | Akashi et al. | |
| 3,867,961 A | 2/1975 | Rudelick | |
| 3,877,287 A | 4/1975 | Duntz, Jr. | |
| 3,940,985 A | 3/1976 | Wyler | |
| 3,945,770 A | 3/1976 | Welker | |
| 3,964,519 A | 6/1976 | De Baun | |
| 4,008,732 A | 2/1977 | Fichter et al. | |
| 4,010,775 A | 3/1977 | Roberts | |
| 4,034,965 A | 7/1977 | King | |
| 4,038,358 A | 7/1977 | Wrasman | |
| 4,050,539 A | 9/1977 | Kashiwara et al. | |
| 4,072,296 A | 2/1978 | Doom | |
| 4,079,747 A | 3/1978 | Roberts | |
| 4,084,783 A | 4/1978 | Wrasman | |
| 4,093,188 A | 6/1978 | Horner | |
| 4,104,915 A | 8/1978 | Husse | |
| 4,108,276 A | 8/1978 | Hall et al. | |
| 4,130,173 A | 12/1978 | Cooksey | |
| 4,140,012 A | 2/1979 | Hendricks | |
| 4,141,334 A | 2/1979 | Hatz et al. | |
| 4,142,413 A | 3/1979 | Bellinga | |
| 4,152,922 A | 5/1979 | Francisco, Jr. | |
| 4,172,583 A | 10/1979 | Wrasman | |
| 4,176,689 A | 12/1979 | Wrasman | |
| 4,204,586 A | 5/1980 | Hani et al. | |
| 4,208,136 A | 6/1980 | King | |
| 4,236,597 A | 12/1980 | Kiss et al. | |
| 4,280,360 A | 7/1981 | Kobayashi et al. | |
| 4,307,620 A | 12/1981 | Jiskoot | |
| 4,314,974 A | 2/1982 | Libby et al. | |
| 4,317,178 A | 2/1982 | Head | |
| 4,317,502 A | 3/1982 | Harris et al. | |
| 4,331,176 A | 5/1982 | Parkison | |
| 4,332,294 A | 6/1982 | Drefahl et al. | |
| 4,371,054 A | 2/1983 | Wirt | |
| 4,390,957 A | 6/1983 | Skarlos et al. | |
| 4,403,518 A | 9/1983 | Welker | |
| 4,421,134 A | 12/1983 | Bruton et al. | |
| 4,461,579 A | 7/1984 | McCallum | |
| 4,468,971 A | 9/1984 | Herzl et al. | |
| 4,485,890 A | 12/1984 | Harris et al. | |
| 4,494,776 A | 1/1985 | Press | |
| 4,497,751 A | 2/1985 | Pluss | |
| 4,498,786 A | 2/1985 | Ruscheweyh | |
| 4,503,594 A * | 3/1985 | Gall et al. | 29/890.142 |
| 4,509,371 A | 4/1985 | Wellman | |
| 4,511,258 A * | 4/1985 | Federighi et al. | 138/42 |
| 4,522,077 A | 6/1985 | Köberle | |
| 4,523,478 A | 6/1985 | Zacharias, Jr. | |
| 4,528,652 A | 7/1985 | Horner et al. | |
| 4,528,847 A | 7/1985 | Halmi | |
| 4,533,015 A * | 8/1985 | Kojima | 138/39 |
| 4,557,296 A * | 12/1985 | Byrne | 138/44 |
| 4,600,544 A | 7/1986 | Mix | |
| 4,605,092 A | 8/1986 | Harris et al. | |
| 4,619,434 A | 10/1986 | Snyder et al. | |
| 4,627,267 A | 12/1986 | Cohrs et al. | |
| 4,632,590 A | 12/1986 | Tsuchimoto | |
| 4,646,575 A | 3/1987 | O'Hair et al. | |
| 4,649,734 A | 3/1987 | Hillburn | |
| 4,649,760 A | 3/1987 | Wedding | |
| 4,667,642 A | 5/1987 | Oxley et al. | |
| 4,697,615 A | 10/1987 | Tsuchimoto et al. | |
| 4,712,585 A | 12/1987 | Evans | |
| 4,729,722 A | 3/1988 | Toth | |
| 4,735,866 A | 4/1988 | Moorehead | |
| 4,744,244 A | 5/1988 | Tanaka | |
| 4,744,255 A | 5/1988 | Jaeger | |
| 4,763,876 A | 8/1988 | Oda et al. | |
| 4,774,750 A | 10/1988 | Platusich | |
| 4,777,977 A | 10/1988 | Platusich | |
| 4,790,864 A | 12/1988 | Kostun | |
| 4,791,810 A | 12/1988 | Old et al. | |
| 4,806,288 A | 2/1989 | Nowosinki et al. | |
| 4,820,990 A | 4/1989 | Moore | |
| 4,926,674 A | 5/1990 | Fossum et al. | |
| 4,974,452 A | 12/1990 | Hunt et al. | |
| 5,029,811 A | 7/1991 | Yamamoto et al. | |
| 5,031,401 A | 7/1991 | Hinderks | |
| 5,058,704 A | 10/1991 | Yu | |
| 5,070,909 A * | 12/1991 | Davenport | 137/625.32 |
| 5,092,499 A | 3/1992 | Sodderland | |
| 5,104,233 A | 4/1992 | Kojima | |
| 5,129,267 A | 7/1992 | Nicholls | |
| 5,213,080 A | 5/1993 | Lambert et al. | |
| 5,226,454 A | 7/1993 | Cabalfin | |
| 5,236,009 A | 8/1993 | Ackroyd et al. | |
| 5,241,992 A | 9/1993 | Oehlbeck et al. | |
| 5,255,716 A | 10/1993 | Wilcox | |
| 5,282,652 A * | 2/1994 | Werner | 285/55 |
| 5,295,397 A | 3/1994 | Hall et al. | |
| 5,307,830 A | 5/1994 | Welker | |
| 5,327,941 A * | 7/1994 | Bitsakis et al. | 138/42 |
| 5,341,848 A | 8/1994 | Laws | |
| 5,350,154 A | 9/1994 | Takama et al. | |
| 5,392,815 A | 2/1995 | Stuart | |
| 5,443,371 A | 8/1995 | Calciolari | |
| 5,454,429 A | 10/1995 | Neurauter | |
| 5,461,932 A | 10/1995 | Hall et al. | |
| 5,495,872 A | 3/1996 | Gallagher et al. | |
| 5,521,840 A | 5/1996 | Bednar | |
| 5,529,093 A | 6/1996 | Gallagher et al. | |
| 5,546,812 A | 8/1996 | Drenthen | |
| 5,606,297 A * | 2/1997 | Phillips | 333/141 |
| 5,617,899 A | 4/1997 | Linton et al. | |
| 5,651,555 A | 7/1997 | O'Reilly et al. | |
| 5,664,760 A | 9/1997 | Army, Jr. et al. | |
| 5,713,333 A | 2/1998 | Cooper et al. | |
| 5,713,556 A | 2/1998 | Yokota | |
| 5,762,107 A | 6/1998 | Laws | |
| 5,813,437 A | 9/1998 | Esser | |
| 5,827,430 A | 10/1998 | Perry et al. | |

| | | |
|---|---|---|
| 5,861,561 A | 1/1999 | Van Cleve et al. |
| 5,867,900 A | 2/1999 | Larson et al. |
| 5,906,354 A | 5/1999 | Gilbert et al. |
| 5,934,320 A | 8/1999 | O'Reilly et al. |
| 5,957,428 A | 9/1999 | Yokota |
| 6,053,054 A | 4/2000 | Wusterbarth et al. |
| 6,085,788 A | 7/2000 | Larson et al. |
| 6,089,348 A | 7/2000 | Bokor |
| 6,145,544 A | 11/2000 | Dutertre et al. |
| 6,164,905 A | 12/2000 | Pabois |
| 6,240,941 B1 | 6/2001 | Small et al. |
| 6,247,489 B1 | 6/2001 | Maskell et al. |
| 6,322,050 B2 | 11/2001 | Haines |
| 6,328,219 B1 | 12/2001 | Taylor et al. |
| 6,338,277 B1 | 1/2002 | Diston et al. |
| 6,360,956 B1 | 3/2002 | Taylor et al. |
| 6,367,774 B1 | 4/2002 | Haines |
| 6,379,035 B1 * | 4/2002 | Kubo et al. ............... 366/340 |
| 6,382,033 B1 | 5/2002 | van Bickkum et al. |
| 6,460,559 B2 | 10/2002 | Smith, Jr. et al. |
| 6,460,898 B1 | 10/2002 | Chieh |
| 6,494,105 B1 | 12/2002 | Gallagher |
| 6,533,065 B2 | 3/2003 | Zanker |
| 6,568,428 B2 | 5/2003 | Pecci et al. |
| 6,595,682 B2 | 7/2003 | Mathys et al. |
| 6,615,872 B2 | 9/2003 | Goebel et al. |
| 6,647,806 B1 * | 11/2003 | Estrada et al. ........... 73/861.28 |
| 6,698,455 B2 | 3/2004 | Ramirez-Rivera |
| 6,698,715 B2 | 3/2004 | Smith, Jr. et al. |
| 6,793,199 B2 | 9/2004 | Bushik et al. |
| 6,834,677 B2 | 12/2004 | Barinaga et al. |
| 6,851,322 B2 | 2/2005 | Gallagher |
| 6,854,342 B2 * | 2/2005 | Payne et al. ............. 73/861.79 |
| 6,877,387 B1 | 4/2005 | Certon et al. |
| 7,404,538 B2 | 8/2005 | Gill |
| 6,979,776 B1 | 12/2005 | Zimmermann |
| 7,011,180 B2 | 3/2006 | Gallagher et al. |
| 7,073,534 B2 | 7/2006 | Sawchuk et al. |
| 7,089,963 B2 | 8/2006 | Meheen |
| 7,107,662 B1 * | 9/2006 | Levario ...................... 29/505 |
| 7,117,827 B1 | 10/2006 | Hinderks |
| 7,161,492 B2 | 1/2007 | Branzell et al. |
| 7,455,106 B2 | 3/2007 | Veneruso et al. |
| 7,213,609 B2 | 5/2007 | Mentesh |
| 7,303,046 B2 * | 12/2007 | Gallagher et al. ........... 181/257 |
| 7,303,047 B2 | 12/2007 | Gallagher et al. |
| 7,303,048 B2 * | 12/2007 | Gallagher et al. ........... 181/296 |
| 7,357,023 B2 * | 4/2008 | Parris et al. .................... 73/197 |
| 7,438,027 B1 | 10/2008 | Hinderks |
| 2001/0032957 A1 | 10/2001 | Haines |
| 2001/0038575 A1 | 11/2001 | Mathys et al. |
| 2002/0074040 A1 | 6/2002 | Schwarz |
| 2005/0178455 A1 | 8/2005 | Cancade et al. |
| 2006/0096650 A1 | 5/2006 | Sawchuk et al. |
| 2006/0137757 A1 | 6/2006 | McKeen et al. |
| 2006/0231149 A1 | 10/2006 | Kulkarni |
| 2007/0000544 A1 | 1/2007 | Thompson |
| 2007/0234720 A1 | 10/2007 | Wilson et al. |
| 2008/0141921 A1 | 6/2008 | Hinderks |
| 2008/0246277 A1 | 10/2008 | Gallagher et al. |
| 2009/0199932 A1 | 8/2009 | Zak |

FOREIGN PATENT DOCUMENTS

| | | |
|---|---|---|
| CA | 2228928 | 8/1995 |
| CA | 2263964 | 2/1998 |
| CA | 2307727 | 11/2000 |
| CH | 20606 | 12/1899 |
| DE | 224528 | 8/1922 |
| DE | 1473034 | 8/1964 |
| DE | 010006795 A1 | 2/2001 |
| EP | 15354 A1 | 9/1980 |
| EP | 34079 A1 | 8/1981 |
| EP | 34079 B1 | 8/1981 |
| EP | 0483206 B1 | 2/1995 |
| EP | 1097354 B1 | 1/2000 |
| EP | 1023982 A1 | 2/2000 |
| FR | 2152478 | 4/1973 |
| FR | 2764336 A1 | 12/1998 |
| GB | 2205631 A | 12/1988 |
| GB | 2277368 A | 10/1994 |
| GB | 2334110 | 2/1998 |
| JP | 57-54705 | 4/1982 |
| JP | 57-190106 | 11/1982 |
| JP | 59046817 A | 3/1984 |
| JP | 03114099 A | 5/1991 |
| JP | 406281019 A | 10/1994 |
| JP | 406281020 A | 10/1994 |
| JP | 2002-134148 | 10/2001 |
| MX | 192110 | 1/1995 |
| MX | 211588 | 1/1995 |
| NO | 55970 | 12/1935 |
| SE | 11648 | 12/1899 |
| SU | 901680 | 1/1979 |
| WO | WO 91/01452 | 2/1991 |
| WO | WO 9420821 A1 | 9/1994 |
| WO | WO 9922207 A1 | 5/1999 |
| WO | WO00/03205 | 1/2000 |
| WO | WO00/03206 | 1/2000 |

OTHER PUBLICATIONS

Ultrasonic Metering Task Group, Ultrasonic Flow Measurement for Natural Gas Applications, A.G.A. Operating Section Transmission Measurement Committee Engineering Technical Note M-96-2-3, © 1996 American Gas Association (41 pages).

Reidar Sakariassen, Paper 5: Why We Use Ultrasonic Gas Meters, North Sea Flow.

Measurement Workshop, Organizer: Norwegian Society of Chartered Engineers et al, (1995) (17 pages).

Terry Cousins, Ultrasonic Flow Measurement Present and Future, Norflow Oil & Gas Flow Measurement in the North Sea, Aberdeen, May 29, 1997 (3 pages).

G.J. Stobie & K. Zanker, Paper 14: Ultrasonic Meter: In Situ Skid Mounted Flow Testing, 1995 North Sea Flow Measurement Workshop, Organizer: Norwegian Society of Chartered Engineers (31 pages).

R. Sakariassen et al., Paper 15: On-Line Quality Control of Ultrasonic Gas Flow Meters, 1997 North Sea Flow Measurement Workshop, Organizer: Norwegian Society of Chartered Engineers (15 pages).

S. De Jong et al. "Effects of Header Configurations on Flow Metering", 1995 International Gas Research Conference (10 pages).

ISO International Standard ISO 5167-1 Measurement of Fluid Flow by means of pressure differential devices—Part 1 Orifice Plates, Nozzles and Venturi tubes Inserted in Circular Cross-Section Conduits Running Full, Sections 7.3 and 7.4 (1991) (6 pages).

Literature Review of the Performance of Flow Conditioners for NMSPU, National Engineering Laboratory (1996) (28 pages).

Gallagher, et al. Development of Gallagher Flow Conditioner (1994) (18 pages).

49 C.F.R. § 192 .1 to 192.455 (2004) (42 pages).

49 C.F.R. § 195 .0 to 195.206 (2004) (18 pages).

ASME B31.4-2006, Pipeline Transportation Systems for Liquid Hydrocarbons and Other Liquids, New York, NY USA, © 2006, The American Society of Mechanical Engineers (126 pages).

ASME B31.8-2003, Gas Transmission and Distribution Piping Systems, New York, NY USA, © 2004, The American Society of Mechanical Engineers (191 pages).

ASME B31.3-2004, Process Piping, New York, NY USA, © 2005, The American Society of Mechanical Engineers (367 pages).

Savant Measurement Corporation, Safe Qualifications, © 2003, Powerpoint Presentation, Kingwood, TX, dated Jan. 1, 2001 (10 pages).

James E. Gallagher, Savant Measurement Corporation, High Velocity Testing of Ultrasonic Acoustic Filter, Kingwood, TX (2 pages).

James E. Gallagher, Savant Measurement Corporation, Ultrasonic Noise Acoustic Filters, Kingwood, TX (6 pages).

Savant Measurement Corporation, Safe R&D Data—Summary of Results, Aug. 2001, Kingwood, TX (1 page).

Gas Technology Institute Metering Research Facility, Test Report: Testing of a Savant 6-inch Safe Acoustic Filter, San Antonio, TX, Jan. 2003 (9 pages).

Defendant Istromet, Inc.'s Original Answer, Affirmative Defenses, and Counterclaims (2004) including reference to publications listed in above-cited number in Exhibits A,B,C,D,E,F,G,H,I, and J. (15 pages).

T.B. Morrow, Orifice Meter Installation Effects in the GRI MRF, Southwest Research Institute, San Antonio, TX (7 pages).

Dr. H.H. Dijstelbergen and Ing. J.T.M. Bergervoet, Optimal Straightening Vanes for Turbine Meters, Essen Belgium, Silvolde, Netherlands, Fluid Flow Measurement, San Antonio, TX, Mar. 19-22, 1995 (14 pages).

E.M. Laws and A.K. Ouazzane, Flow Conditioning for Orifice Plate Flow Meters, Department of Aeronautical, Mechanical, and Manufacturing Engineering, University of Salford, Salford, UK, Fluid Flow Measurement, San Antonio, TX, Mar. 19-22, 1995 (14 pages).

J.E. Gallagher, J.R. Coats, H.W. Butts, P.J. Lanasa, Custody Transfer Metering Performance for Turbine and Positive Displacement Meters on Batched Crude Oil Pipelines, Houston, Texas, Fluid Flow Measurement, San Antonio, TX, Mar. 19-22, 1995 (30 pages).

J.E. Gallagher, P.J. Lanasa, Field Performance of the Gallagher Flow Conditioner, Houston, Texas, Fluid Flow Measurement, San Antonio, TX, Mar. 19-22, 1995 (20 pages).

William J. Astelford, Low Pressure Loop Tests of Shell Flow Conditioners, Southwest Research Institute, San Antonio, Texas, Jun. 1993 (144 pages).

Ing C.J. Benard, Handbook of Fluid Flowmetering, pp. 25, 123, 126-127, 280-282; Effect of Pipework on Flowmeter Calibration, 1st Edition, Surrey England, © 1988 The Trade & Technical Press Limited (12 pages).

John W. Stuart, Pacific Gas and Electric Company, San Francisco, CA, "Attenuation of Ultrasonic Noise in 2" ABS Pipe Fittings, Presentation at American Gas Association Conference, Dallas, TX, Apr. 2001 (4 pages).

Marcel J.M. Vermeulen et al., Instromet Ultrasonics BV, Dordrecht, The Netherlands and Instromel Inc., Houston, "A Model For Estimation of the Ultrasonic Acoustic Noise Level Emitted by Pressure Regulating Valves and Its Influence on Ultrasonic Flowmeters," Presentation at American Gas Association Conference, Dallas, TX, Apr. 2001 (10 pages).

Sens, Marcel and Teule, Claude; Étude Théorique et expérimentale d'un nouveau redresseur d'écoulement (Theoretical and Experimental Study of a New Flow Straightener) (18 pages).

Van Vlack, Lawrence H.; Deformation of Plastics, Section 7-5, Elements of Materials Science and Engineering, © 1975, pp. 234-241, Third Edition, Addison-Wesley Publishing Company, Reading, Massachusetts.

Faure Herman; Heliflu™ TLM, Specification Sheet, Mar. 2005 (2 pages).

Faure Herman; Heliflu™ TLM-C, Specification Sheet, Mar. 2005 (2 pages).

Vortab Company; VSR-Vortab® Short Run, © 1999-2006 Vortab Company (2 pages), printed on Mar. 22, 2007.

Vortab Company; VIS-Vortab® Insertion Sleeve, © 1999-2006 Vortab Company (2 pages), printed Mar. 22, 2007.

Emerson Process Management; Gas Measurement Products, printed Mar. 20, 2007, www.emersonprocess.com/daniel/products/gas/productlevel1.htm, www.emersonprocess.com/daniel/contacts.htm, © 1996-2005 Emerson (3 pages).

Komax Systems Inc.; Custody Transfer Mixer, printed Dec. 6, 2006, www.komax.com/det-ogcustody.html, (5 pages).

Ross Online; LPD Static Mixers, printed Dec. 6, 2006, www.staticmixers.com/motionless-lpd.asp, (2 pages).

Ross Online; The ISG, printed Dec. 6, 2006, www.staticmixers.com/motionless-isg.asp, (2 pages).

Ross Online; Sanitary LPD Static Mixers, printed Dec. 6, 2006, www.staticmixers.com/motionless-lpd-sanitary.asp, (1 page).

Koflo Corporation; Stock Stainless Steel Static Mixers, © 2006 Koflo Corporation, printed Dec. 6, 2006, www.koflo.com/stock.html, (1 page).

Koflo Corporation; Clear PVC Static Mixers, © 2006 Koflo Corporation, printed Dec. 6, 2006, www.koflo.com/pvc.html, (1 page).

Koflo Corporation; Static Flanged Industrial Mixers, © 2006 Koflo Corporation, printed Dec. 6, 2006, www.koflo.com/flanged.html, (1 page).

Statiflo International Ltd.; Dynamic Leaders in Motionless Mixing, © 2004 Statiflo International Ltd., printed Dec. 6, 2006, www.staticmixers.net/cgi-bin/page.pl?page1D=1&Language1D=1, (1 page).

Chemineer, Inc.; Kenics Products, © 2005 Chemineer, printed Dec. 6, 2006, www.chemineer,com/kenics_products.php, (1 page).

Chemineer, Inc.; Chemineer Products, © 2005 Chemineer, printed Dec. 6, 2006, www.chemineer.com/dchem_products.php, (2 pages).

JLS International; Samhwa Static Mixers, printed Dec. 6, 2006, www.jlsintl.com/samhwa/samhwa.html, (2 pages).

Pump Manufacturers; Static Mixers, printed Dec. 6, 2006, www.pump-manufacturers.com/static_mixers.html, (4 pages).

Cumberland Engineering Corporation; Static Mixers, Extusion Accessories- Downstream Extrusion, printed Dec. 6, 2006, www.cumberland-plastics.com/index.cfm/datakey/3/category.

Cleveland Eastern Mixers; Industrial Mixers, Agitators and Impellers-Clevelan+ Eastern Mixers, © 2006 Cleveland Eastern Mixers, printed Dec. 6, 2006, www.clevelandmixer.com, (5 pages).

ThomasNet Industrial Newsroom; Static mixers offer complete mixing and flow division, Feb. 9, 2004, news.thomasnet.com/fullstory/30419/1531, © 2006 Thomas Publishing Company, (4 pages).

Cleveland Eastern Mixers; Industrial Static Tube Mixers, © 2006 Cleveland Eastern Mixers, printed Dec. 6, 2006, www.clevelandmixers.com/products/static-mixers/tube-mixers/default.html, (1 page).

Cleveland Eastern Mixers; Static High Viscosity Mixers, © 2006 Cleveland Eastern Mixers, printed Dec. 6, 2006, www.clevelandmixer.com/products/static-mixers/high-viscosity/default.html, (2 pages).

Bakker, André, Laroche, Richard D. And Marshall, Elizabeth M.; Laminar Flow in Static Mixers with Helical Elements, © 1998, updated Feb. 15, 2000, Published in "The Online CFM Book" at http://www.bakker.org/cfm., (11 pages).

Calibron Systems Inc.; Syncrotrak® Model 05, printed Dec. 6, 2006, www.calibron.com/products/model_s05.asp, (2 pages).

Calibron Systems Inc.; Syncrotrak® Model 120, printed Dec. 6, 2006, www.calibron.com/products/model_s120.asp, (2 pages).

Calibron Systems Inc.; Syncrotrak® Description, printed Dec. 6, 2006, www.calibron.com/products/provers.asp, (2 pages).

En-Fab, Inc.; Meter provers, printed Dec. 6, 2006, www.en-fabinc.com/meter%20Provers.htm, (1 page).

Calibron Systems Inc.; Products, printed Dec. 6, 2006, www.calibron.com/products/products.asp, (1 page).

Calibron Systems Inc.; Densitrak® Models D625, printed Dec. 6, 2006, www.calibron.com/products/den_models.asp, (2 pages).

Mathers, Dick; "Modern" Small Volume Provers, Calibron Systems, Inc., ISA Delhi-Dec. 2005, Workshop on Custody Transfer Metering (15 pages).

Redilla, Richard L., Design of Displacement Provers, Smith Meter Inc., Technical Paper 105, Bulletin TPOV002, pp. 1-7, © Apr. 1993 Smith Meter, Inc.

Jakubenas, Peter P., Theory and Application of Pulse Interpolation to Prover Systems, Smith Meter Inc., Technical Paper 126, Bulletin TPOV001, pp. 1-6, © Apr. 1993 Smith Meter, Inc.

Ryan, Brendan S.; Liquid Flow Provers (Conventional), Smith Meter Inc., class No. 252, Corpus Christi, Texas, pp. 1-7 (no date).

Tyco International, Total Flow Control Solutions™, © 2006 Tyco Flow Control and printed Dec. 6, 2006, www.tycoflowcontrol-na.com/products.asp, (1 page).

Tyco International, Ball Valves, © 2006 Tyco Flow Control and printed Dec. 6, 2006, www.tycoflowcontrol-na.com/products_results.asp?Selection=Ball+Valves&m=1, (2 pages).

Tyco International, Butterfly Valves, © 2006 Tyco Flow Control and printed Dec. 6, 2006, www.tycoflowcontrol-na.com/products_results.asp?Selection=Butterfly+Valves&m=1, (1 page).

Tyco International, Check Valves, © 2006 Tyco Flow Control and printed Dec. 6, 2006, www.tycoflowcontrol-na.com/products_results.asp?Selection=Check+Valves&m=1, (1 page).

Tyco International, Control Valves, © 2006 Tyco Flow Control and printed Dec. 6, 2006, www.tycoflowcontrol-na.com/products_results.asp?Selection=Control+Valves&m=1, (1 page).

Tyco International, Gate Valves, © 2006 Tyco Flow Control and printed Dec. 6, 2006, www.tycoflowcontrol-na.com/products_results.asp?Selection=Gate+Valves&m=1, (1 page).

Tyco International, Globe Valves, © 2006 Tyco Flow Control and printed Dec. 6, 2006, www.tycoflowcontrol-na.com/products_results.asp?Selection=Globe+Valves&m=1, (1 page).

Tyco International, H.P. Butterfly Valves, © 2006 Tyco Flow Control and printed Dec. 6, 2006, www.tycoflowcontrol-na.com/products_results.asp?Selection=H.P.+Butterfly+Valves&m=1, (1 page).

Tyco International, Hygienic Valves, © 2006 Tyco Flow Control and printed Dec. 6, 2006, www.tycoflowcontrol-na.com/products_results.asp?Selection=Hygienic+Valves&m=1, (1 page).

Tyco International, Knife Gate Valves, © 2006 Tyco Flow Control and printed Dec. 6, 2006, www.tycoflowcontrol-na.com/products_results.asp?Selection=Knife+Gate+Valves&m=1, (2 pages).

Tyco International, Pressure Relief Valves, © 2006 Tyco Flow Control and printed Dec. 6, 2006, www.tycoflowcontrol-na.com/products_results.asp?Selection=Pressure+Relief+Valves&m=1, (1 page).

Tyco International, Rotary Process Valves, © 2006 Tyco Flow Control and printed Dec. 6, 2006, www.tycoflowcontrol-na.com/products_results.asp?Selection=Rotary+Process+Valves&m=1, (1 page).

Tyco International, Slurry Valves, © 2006 Tyco Flow Control and printed Dec. 6, 2006, www.tycoflowcontrol-na.com/products_results.asp?Selection=Slurry+Valves&m=1, (1 page).

Cashco; Control Valves Do What They Are Told!, © 1998 TWI Press, Inc., www.maintenanceresources.com/referencelibrary/controlvalves/CashcoControl.pg, (3 pages).

Emerson Process Management; Control Valve Handbook, © 2005 Fisher Controls International LLC, Fourth Edition, U.S.A., cover page, copyright page (i to xiv) pp. 1-36.

Coen; AC Flow Control Valve, printed Dec. 6, 2006, www.coen.com/i_html/acvalve.html, (3 pages).

Welker Engineering Company; Welker Crude Oil Sampler, 1997, Sugar Land, Texas, pp. 1-3.

Welker Engineering Company; Installation, Operation & Maintenance Manual for Welker® Sampler Model GSS-1, © 2002 Welker Engineering Company, Sugar Land, Texas, pp. 1-22.

Robertson Geologging Limited; Water/Gas Sampler Probes, printed Dec. 6, 2006, www.geologging.com/english/products/probes/water_gas_sampler.htm, (2 pages).

Schlumberger; Westbay System-Sampling Probes, © Schlumberger Limted and printed Dec. 6, 2006, www.slb.com/content/services/additional/water/monitoring/multilevel/sampling_probes..., (2 pages).

Sensistor Technologies; AP55 Sniffer Probe, Dec. 2006, pp. 1-2.

Professional Equipment; EMS E6 Reusable Single-Stage Viable Sampler, © 2004 Professional Equipment, Inc. and printed Dec. 6, 2006, www.professionalequipment.com/xq/ASP/product-ID.2832/id.33/subID.38/qx/default..., (2 pages).

Endecotts Ltd; Sampling Equipment, Sleeve Sampler, © 2004 Endecotts Ltd and printed Dec. 6, 2006, www.endecotts.com/sampling/sleeve-sampler.htm, (2 pages).

Welker Engineering Company; Welker Light Liquid Hydrocarbon Sampler, © 2007 Welker Engineering Company and printed Dec. 6, 2006, www.welkeraisa.com/welker_cd/light_liquid_samplers/light_liquid_samplers01.html, (2 pages).

SKC Inc.; Particulate Samplers, Dust Samplers, Cyclones, Inpactors, and IOMs, © 1995-2006 SKC, Inc. and printed Dec. 6, 2006, www.skcinc.com/dust.asp, (4 pages).

McFarland Pump; Fluid Sampling Systems, printed Dec. 6, 2006, www.mcfarlandpump.com/fluid.htm, (4 pages).

Seedburo; Seedburo Plated Probes and Triers, Dec. 2006, www.seedburo.com, p. 25.

Land; Lancom Portable Flue Gas Analyzers, © 2001-2006 Land, Sep. 2006, www.landinst.com, pp. 1-2.

Mount Sopris Instrument Co., Inc.; 2FSA-1000 Fluid Sampler, Oct. 22, 2002, pp. 1-9.

Welker Engineering Company; Welker Composite Gas Sampler, © 2007 Welker Engineering Company and printed Dec. 6, 2006, www.welkerasia.com/welker_cd/gas-products/gas_products01.html, (2 pages).

K2BW Environmental Equipment Services Co.; Gas Sampling Probes for Continuous Emission Monitoring, © 1996-2004 K2BW and printed Dec. 6, 2006, www.k2bw.com/5_C_29.htm, (3 pages).

Jonas, Inc.; EPRI Isokinetic Sampling Nozzles (Probes) for Gases and Liquids, © 2000-2004 and printed Dec. 6, 2006, www.steamcycle.com/nozzle.htm, (3 pages).

PGI International; Gas and Liquid Sampling Sytems, © 2006 PGI International and printed Dec. 6, 2006, www.pgiint.com/gl_Sampling.asp, (1 page).

PGI International; Innovative Systems & Solutions, © May 2006, pp. 1-6.

Canada Pipeline Accessories; Flow Nozzles, Jan. 31, 2007, www.flowconditioner.com/products/flown.htm, (3 pages).

Emerson Process Management; Daniel Profiler™ Flow Conditioning Plate, Nov. 2001, Daniel Publication, Dan-1852, pp. 1-2.

Vortab Company; Products and Technology, © 1999-2006 Vortab Company and printed Mar. 21, 2007, www.vortab.com/products.htm, pp. 1-2.

3M; Scotch-Weld™ Epoxy Adhesive DP420 Black/Off-White, Mar. 2004, Industrial Business, Industrial Adhesives and Tapes Division, St. Paul, MN, © 2004 3M pp. 1-8.

San Diego Plastics, Inc.; Noryl® printed Dec. 4, 2006, www.sdplastics.com/noryl.html, (4 pages).

GE Plastocs; Noryl PPX® Resin PPX7200, © 1997-2007 General Electric Company, last updated Feb. 7, 2006, Americas: Commercial, pp. 1-3.

Prospector; Noryl PPX® PPX7112 Resin, Nov. 30, 2006, prospector.ides.com/datasheet.aspx?I=34&E=57308, © 2006 IDES-The Plastic Web, pp. 1-3.

Zeus® Technical Whitepaper, Peek vs. Metal: Why Plastic is Better, © 2005 Zeus Industrial Products, Inc. (3 pages).

Matweb, The Online Materials Database, Overview—Polyetheretherketone, Unreinforced, © 1996-2007 Automation Creations, Inc. (5 pages).

Matweb Material Property Data, RTP Company RTP 2205 A Polyetherketone (PEK) Glass Fiber, © 1996-2007 Automation Creations, Inc. (2 pages).

FMC Technologies, Compatability Manual, Liquids—Metals—Elastomers—Plastics, © 1996 FMC Technologies Measurement Solutions, Inc. (18 pages).

FMC Technologies, Positive Displacement Flowmeters, Multipulse Medium Capacity, © 1996 FMC Invalco (2 pages).

FMC Technologies, Invalco PD Flowmeter, © 2001 FMC Invalco (3 pages).

PCT/US08/03447 filed Mar. 14, 2008 claiming priority from the present application; International Search Report (2 pages) and Written Opinion of the International Searching Authority (10 pages), both mailed Jul. 18, 2008.

Francisco, "L.A.C.T. Unit Design," Welker Flow Measurement Systems, Inc., Article No. ARTCO2052301 In Flowmeter Directory Feb. 5, 2003; Items 2-5, 7 and 12 and sidebar of related products; http://web.archive.org/web/20030205154835/http://www.flowmeterdirectory.com/flowmeter_artc/flowmeter_artc_02052301.html; (3 pages).

* cited by examiner

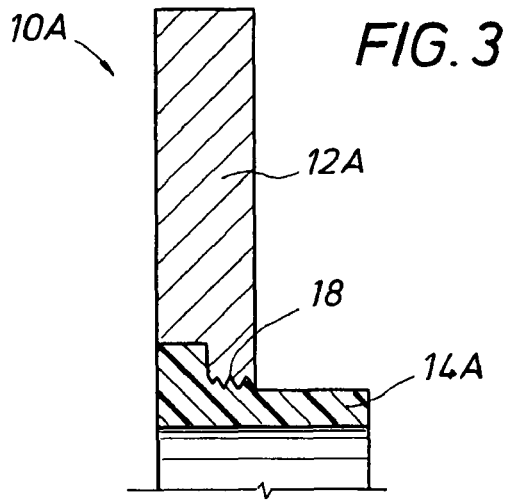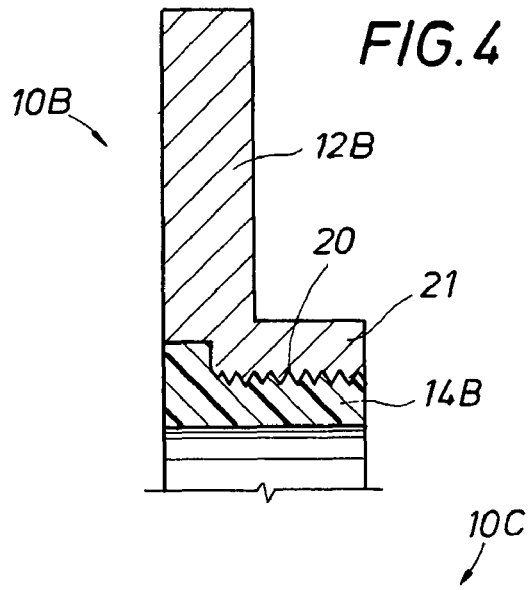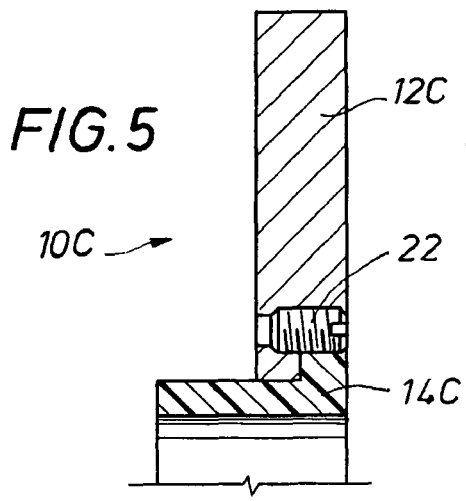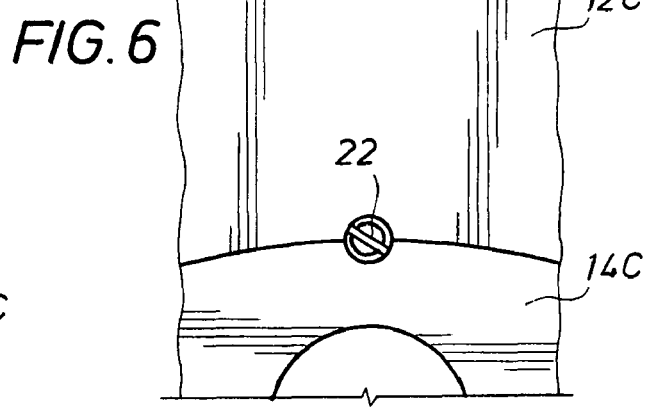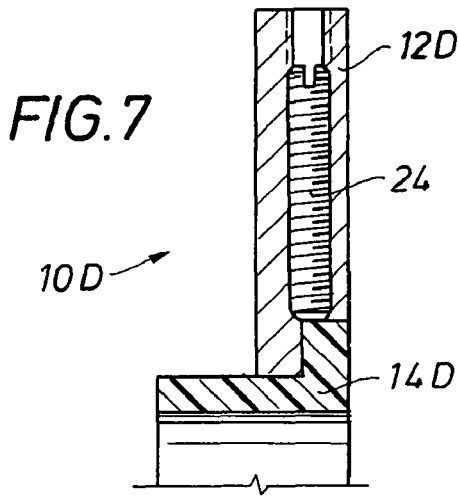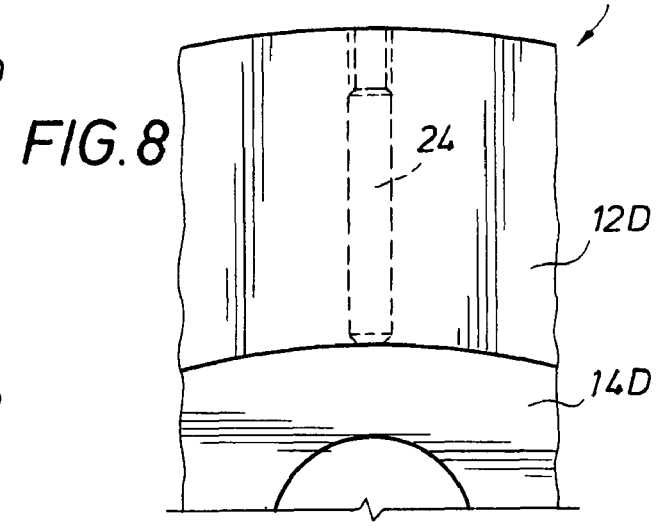

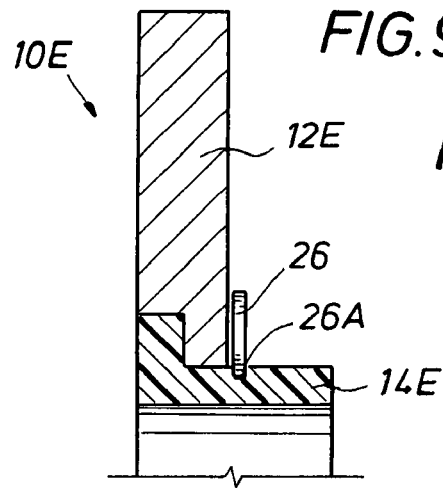
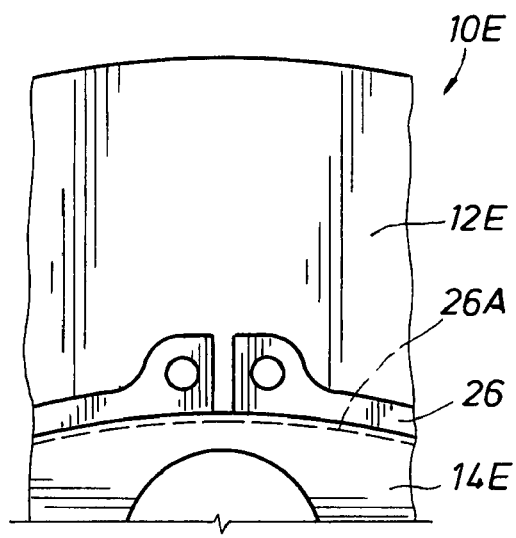
FIG. 9    FIG. 10
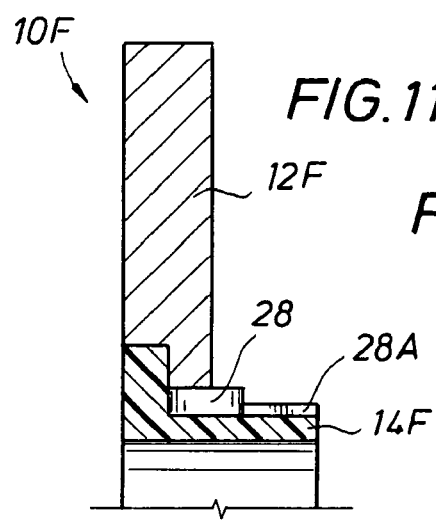
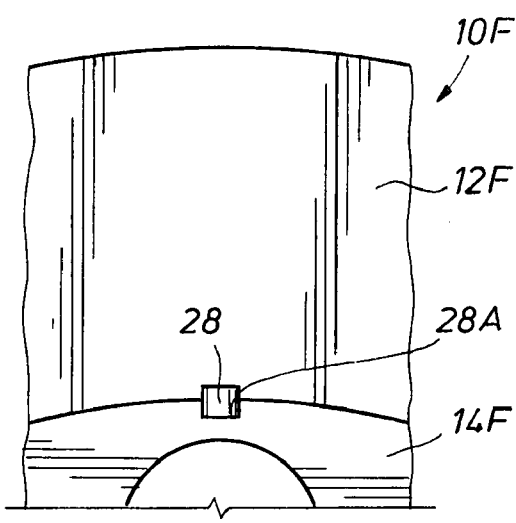
FIG. 11    FIG. 12
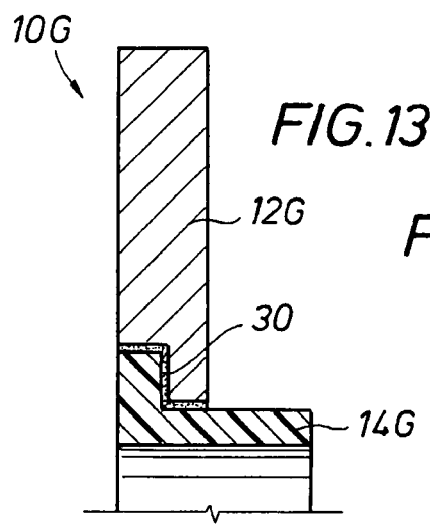
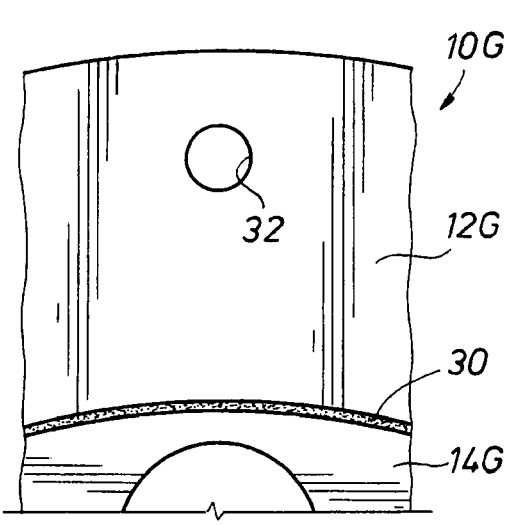
FIG. 13    FIG. 14

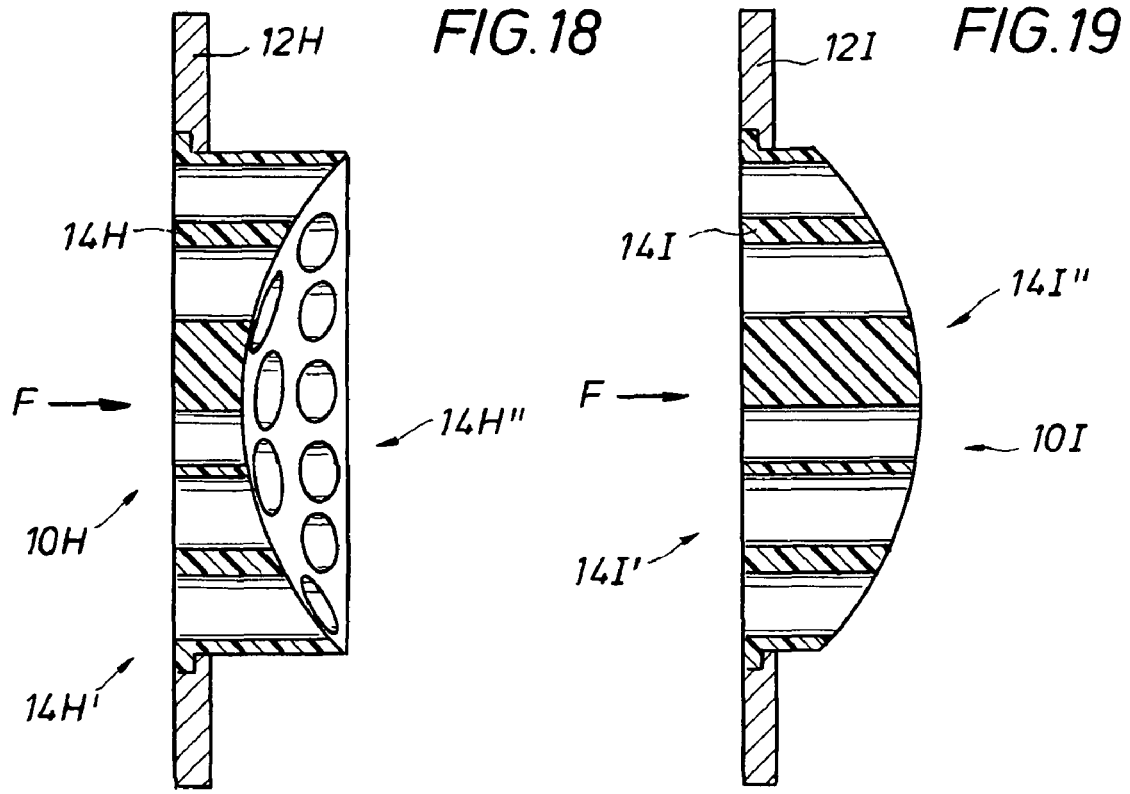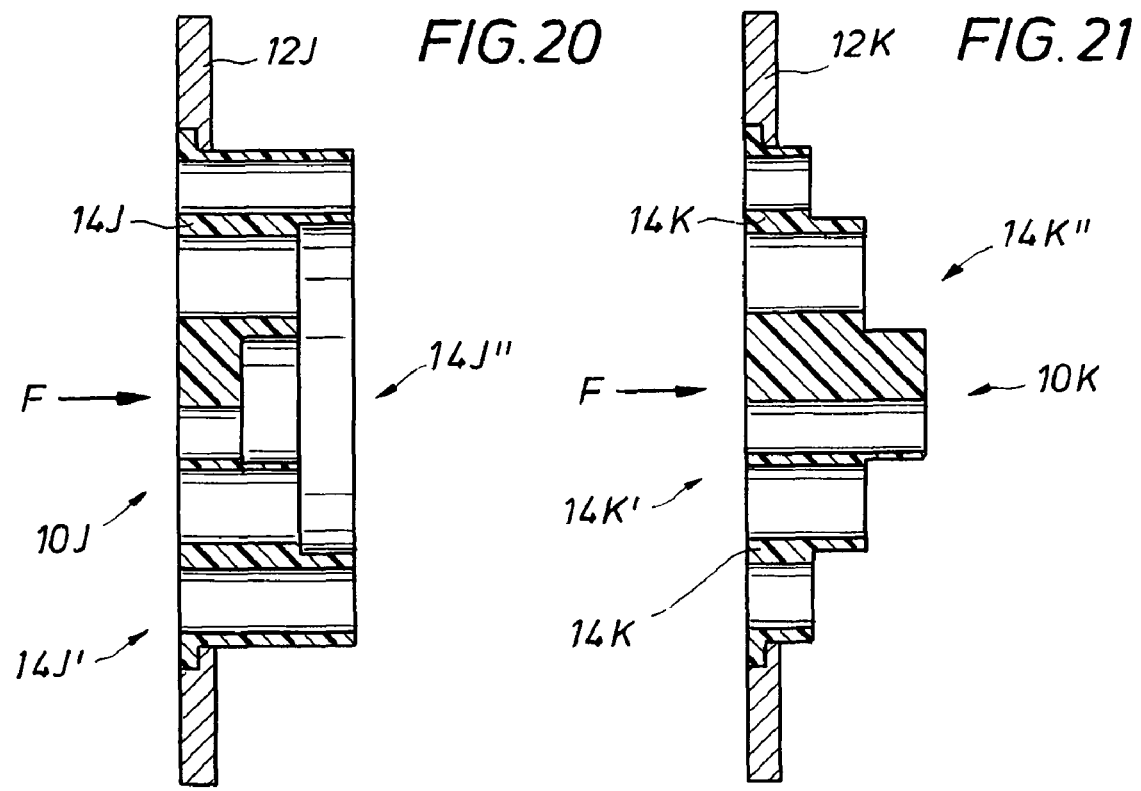

MULTIPLE MATERIAL PIPING COMPONENT

CROSS-REFERENCE TO RELATED APPLICATIONS

N/A

STATEMENT REGARDING FEDERALLY SPONSORED RESEARCH OR DEVELOPMENT

N/A

NAMES OF THE PARTIES TO A JOINT RESEARCH AGREEMENT

N/A

REFERENCE TO SEQUENCE LISTING

N/A

BACKGROUND OF THE INVENTION

1. Field of the Invention

The present invention relates to piping components for use with fluids in pipes. Particularly, this invention relates to piping components for use with fluids in piping in the oil, gas, petroleum and chemical industries.

2. Description of the Related Art

Piping used in the oil gas, petroleum and chemical industries are regulated in part by the Department of Transportation ("DOT"). In addition, the American Society of Mechanical Engineers ("ASME") provides standards associated with oil and gas facilities.

For example, pipes carrying hazardous liquids such as hydrocarbons are regulated by DOT Title 49 C.F.R. §195. This regulation states that piping and all associated connections be comprised of steel. This includes valves, fittings, branch connections, closures, flange connections, station piping, and other fabricated assemblies. Section 192 of Title 49 of the DOT Federal Regulations, which applies to all other piping for fluids, also requires that piping and all associated connections be comprised of steel if pressurized over 100 psig. In addition, ASME standards require all steel connections in an oil, gas, petroleum and/or chemical environment. Thus, DOT regulations and ASME standards require piping to have all steel containment when transporting hazardous liquids and carbon dioxide and/or transporting fluids that are pressurized over 100 psig.

Currently, most piping components have been comprised of all-steel, with the exception of wearing components, such as filters, gaskets and other sealing members. Steel has traditionally been used to comply with DOT regulations and ASME standards, as steel maintains its structural integrity in an environment that is typically corrosive and/or degrading in nature. However, the all-steel design of piping components make the manufacturing costs expensive.

For example, an all-steel profile plate is proposed in U.S. Pat. Nos. 5,495,872 and 5,529,093. The same patents also disclose an anti-swirl device fabricated from all steel. While both the profile plate and anti-swirl device are effective piping components, they are expensive to manufacture.

Other examples of piping components that have traditionally been comprised of steel include flowmeters, such as ultrasonic flowmeters, orifice flowmeters and turbine flowmeters; flow nozzles; meter tubes; venturi flowmeters; and other products such as those distributed by Daniel Measurement and Control, Inc. of Houston, Tex. Valves such as gate valves, ball valves, check valves, globe valves, wafer valves, butterfly valves and control valves have been primarily comprised of steel. Also, piping components, such as static mixers, several of which are proposed in U.S. Pat. Nos. 4,034,965, 4,072,296, 4,093,188, 4,314,974, 4,461,579, 4,497,751, 4,498,786, 4,600,544 and 4,806,288; small volume provers, several of which are proposed in U.S. Pat. Nos. 3,421,360, 3,673,851, 3,877,287, 4,152,922, 4,627,267 and 4,649,734; and samplers, several of which are proposed in U.S. Pat. Nos. 4,307,620, 4,390,957, 4,744,244, 4,744,255, 4,820,990, 4,926,674 and 5,129,267 preferably have a steel construction for the durable non-wearing components. These piping components and many other piping are expensive to manufacture due to their steel construction. However, the steel construction for durable non-wearing components was traditionally required to comply with ASME standards and DOT regulations so that the component holds up to the hostile fluid environment in the oil, gas, petroleum and chemical industries.

Other industries have proposed devices of different materials. For example, the water industry uses flow conditioners fabricated from polypropylene. In yet another industry, U.S. Pat. No. 7,089,963 proposes a flow laminarization device to improve the performance of turbochargers, which emphasizes a device made from one material, preferably plastic. While, an all plastic device, such as these, would be more cost effective than the current all steel flow conditioners, it would not be acceptable in the oil, gas, petroleum and chemical industries because it would not meet DOT regulations, which require steel containment.

In yet another industry, the onboard marine vessel industry, a two material device has been developed to throttle fluid flow. U.S. Pat. No. 5,327,941 proposes a cascade orificial resistive device ("CORD"), which is comprised of a hollow metal housing with multiple elastomeric CORD plates mounted within the body. While a two material device would be more cost effective than an all-steel piping component, the proposed cord device is not fabricated to operate in the hostile fluid environment of the oil, gas, petroleum and chemical industries.

The above discussed U.S. Pat. Nos. 3,421,360, 3,673,851, 3,877,287, 4,034,965, 4,072,296, 4,093,188, 4,152,922, 4,307,620, 4,314,974, 4,390,957, 4,461,579, 4,497,751, 4,498,786, 4,600,544, 4,627,267, 4,649,734, 4,744,244, 4,744,255, 4,806,288, 4,820,990, 4,926,674, 5,129,267, 5,327,941, 5,495,872, 5,529,093, and 7,089,963 are incorporated herein by reference for all purposes in their entirety.

It would be desirable to provide low cost piping components that both comply with DOT regulations, and ASME standards, as well as withstand the hostile fluid environment in the oil, gas, petroleum and chemical industries.

BRIEF SUMMARY OF THE INVENTION

In view of the described opportunities for improvement in the oil, gas, petroleum and chemical industries, this invention provides low cost piping components that comply with DOT regulations and ASME standards, as well as withstand the hostile fluid environment of the oil, gas, petroleum and chemical industries.

The piping component according to this invention is comprised in part of a steel housing that can be positioned with a steel piping. The steel housing of the invention serves to provide the continuous metal connection required by DOT regulations and ASME standards. The steel housing can be a flange, a ring, a casing, or a combination of these items that form an opening in which a piping component body is inserted, at least in part.

The piping component body is comprised of non-steel, or a combination of steel and non-steel parts. Ideally, the body is comprised of plastic, which is less expensive and facilitates forming, including machining or molding while maintaining its structural integrity in a hostile fluid environment, such as in oil, gas, petroleum or chemicals. Alternatively, ceramic could be used to fabricate the body.

Because plastic is easily formed, the bodies of various piping components can be formed in new and different shapes that previously could not be economically performed due to the limitations of working with metal. For example, the upstream and/or downstream sides of the bodies of plastic flow conditioners can be formed into concave or convex profiles with or without steps. It is contemplated that many piping component bodies will be able to take on different shapes and configurations than the current standard designs, because plastic can be formed easier and at a reduced cost.

It is further contemplated that piping components such as flowmeters, flow conditioners, turbine meters, flow nozzles, venturi meters, small volume provers, static mixers, samplers, and valves, which have preferably been made from steel, with the exception of wearing components, could now substitute plastic components for some of the metal components.

One embodiment of a piping component includes connecting the plastic body of the piping component to a steel ring so that the plastic body of the piping component extends into the steel pipe thereby complying with DOT regulations and ASME standards. Another embodiment of the piping component includes fastening the plastic body directly to the steel piping.

It is contemplated that the plastic body of the piping component can be fastened to the metal, such as steel, housing using an adhesive, a set screw connection, a threaded connection, press or compression fit connection, a key connection or a pin connection or a combination of these connections.

BRIEF DESCRIPTION OF THE DRAWINGS

A better understanding of the present invention can be obtained with the following detailed description of the various disclosed embodiments in the drawings:

FIG. 3 is an enlarged detailed sectional view of a threaded connection between the plastic body of a piping component and the steel housing.

FIG. 4 is an enlarged detailed sectional view of a threaded connection between the plastic body of a piping component and the steel housing, similar to FIG. 3, but with an extended threaded hub.

FIG. 5 is an enlarged detailed sectional view of a set screw connection between the plastic body of a piping component and the steel housing.

FIG. 6 is a plan view of the set screw connection shown in FIG. 5.

FIG. 7 is an enlarged detailed sectional view of a radial set screw connection between the plastic body of a piping component and the steel housing.

FIG. 8 is a plan view of the radial set screw connection, as shown in FIG. 7, with the set screw shown in phantom view.

FIG. 9 is an enlarged detailed sectional view of a snap ring connection between the plastic body of a piping component and the steel housing.

FIG. 10 is a bottom view of the snap ring connection as shown in FIG. 9.

FIG. 11 is an enlarged detailed sectional view of a key connection between the plastic body of a piping component and the steel housing.

FIG. 12 is a bottom view of the key connection as shown in FIG. 11.

FIG. 13 is an enlarged detailed sectional view of an adhesive connection between the plastic body of a piping component and the steel housing.

FIG. 14 is a bottom view of the adhesive connection as shown in FIG. 13.

FIG. 18 is a sectional view, similar to FIG. 2, of a piping component with a concave downstream face.

FIG. 19 is a sectional view, similar to FIG. 2, of a piping component with a convex downstream face.

FIG. 20 is a sectional view, similar to FIG. 2, of a piping component with a concave step downstream face.

FIG. 21 is a sectional view, similar to FIG. 2, of a piping component with a convex step downstream face.

DETAILED DESCRIPTION OF THE INVENTION

Figure 1:
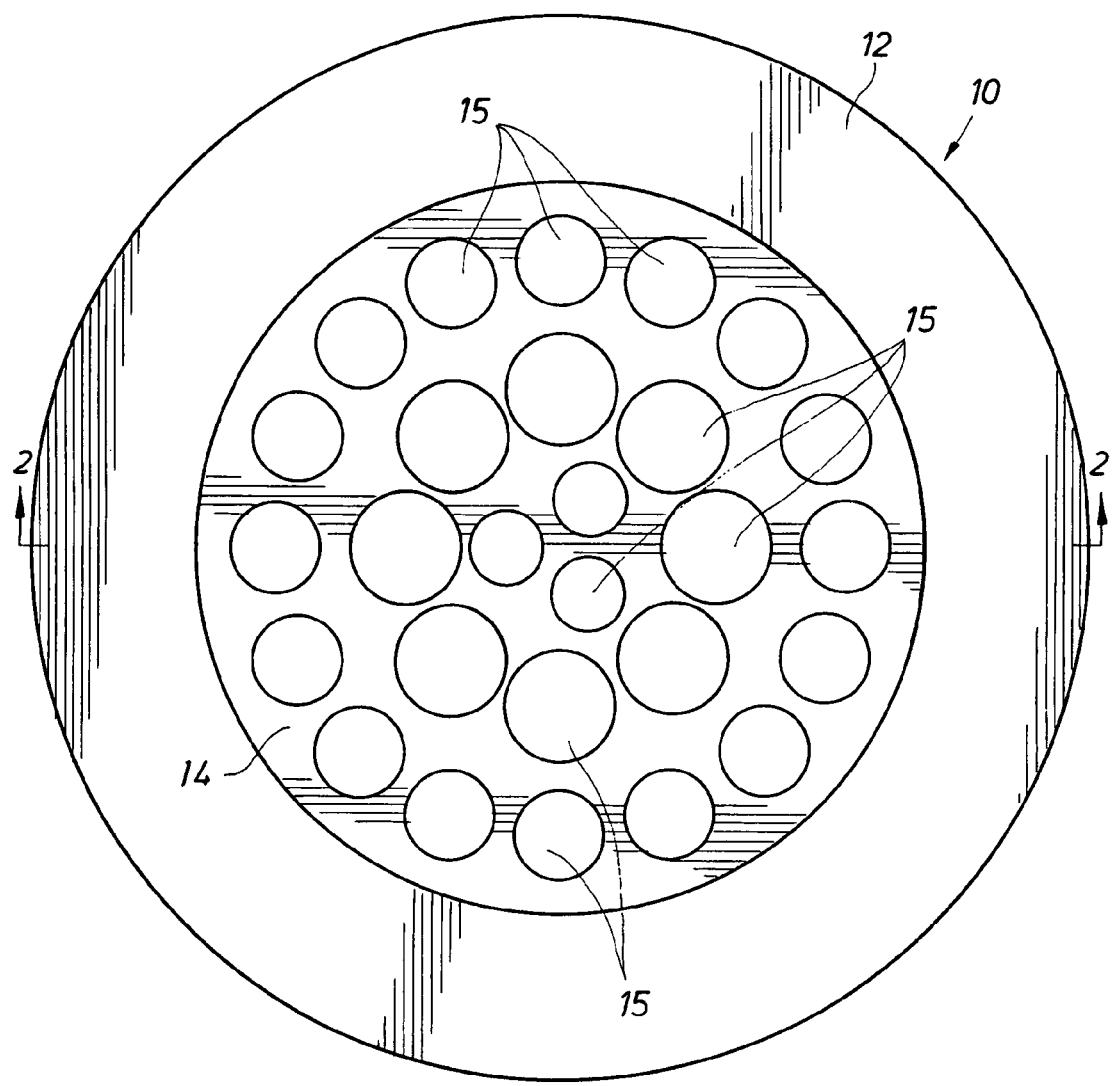
FIG. 1 is a plan view of a flow conditioner profile plate according to one embodiment of the invention having a plastic body positioned in a steel housing or ring.

Generally, the present invention provides a low cost piping component that complies with DOT regulations and ASME standards, as well as withstands the hostile fluid environment in the piping systems of the oil, gas, petroleum and chemical industries along with a method for manufacturing the piping component.

The piping component according to the present invention is comprised in part of a metal, such as steel, to fabricate a housing to be positioned with steel piping. The steel housing forms an opening in which the piping component body is positioned. The piping component body could be fabricated from plastic or ceramic or a combination of plastic or ceramic and metal. The plastic and ceramic should have properties that are compatible with the hostile oil, gas, petroleum and chemical environments. An exemplary ceramic for use in these environments is partially stabilized zirconia sold under the trademark NILCRA by ICI Australia Operations Proprietary Limited of Melbourne, Victoria, Australia. An exemplary thermoplastic for use in the oil, gas, petroleum and chemical industries is NORYL PPX® Resin PPX7200, a synthetic thermoplastic resin distributed by GE Plastics. NORYL PPX is a federally registered trademark of the General Electric Company of Schenectady, N.Y. The following table, last updated on Feb. 7, 2006 by GE Plastics, describes the advantageous properties of this resin:

| NORYL PPX ® Resin PPX7200 PP + PPE + PS. Improved chemical resistance and surface aesthetics in injection molded applications. NSF61-capable. UL-94 HB listed. | | | |
| --- | --- | --- | --- |
| TYPICAL PROPERTIES[1] | TYPICAL VALUE | UNIT | STANDARD |
| MECHANICAL | | | |
| Tensile Stress, yld, Type I, 2.0 in/min | 4800 | psi | ASTM D 638 |
| Tensile Stress, brk, Type I, 2.0 in/min | 3900 | psi | ASTM D 638 |
| Tensile Strain, yld, Type I, 2.0 in/min | 10 | % | ASTM D 638 |
| Tensile Strain, brk, Type I, 2.0 in/min | 130 | % | ASTM D 638 |
| Tensile Modulus, 2.0 in/min | 179000 | psi | ASTM D 638 |
| Flexural Stress, yld, 0.05 in/min, 2 inch span | 7000 | psi | ASTM D 790 |
| Flexural Modulus, 0.05 in/min, 2 inch span | 209000 | psi | ASTM D 790 |
| Tensile Stress, yield, 50 mm/min | 34 | MPa | ISO 527 |
| Tensile Stress, break, 50 mm/min | 28 | MPa | ISO 527 |
| Tensile Strain, yield, 50 mm/min | 8.2 | % | ISO 527 |
| Tensile Strain, break, 50 mm/min | 115 | % | ISO 527 |
| Tensile Modulus, 1 mm/min | 1670 | MPa | ISO 527 |
| Flexural Stress, yield, 2 mm/min | 48 | MPa | ISO 178 |
| Flexural Modulus, 2 mm/min | 1600 | MPa | ISO 178 |
| IMPACT | | | |
| Izod Impact, unnotched, 73° F. | 27 | ft-lb/in | ASTM D 4812 |
| Izod Impact, notched, 73° F. | 2.80 | ft-lb/in | ASTM D 256 |
| Izod Impact, notched, −22° F. | 0 | ft-lb/in | ASTM D 256 |
| Instrumented Impact Total Energy, 73° F. | 319 | in-lb | ASTM D 3763 |
| Izod Impact, unnotched 80*10*4 +23° C. | NB | kJ/m$^2$ | ISO 180/1U |
| Izod Impact, unnotched 80*10*4 −30° C. | NB | kJ/m$^2$ | ISO 180/1U |

-continued

NORYL PPX ® Resin PPX7200
PP + PPE + PS. Improved chemical resistance and surface aesthetics in injection molded
applications. NSF61-capable. UL-94 HB listed.

| | | | |
|---|---|---|---|
| Izod Impact, notched 80*10*4 +23° C. | 14 | kJ/m$^2$ | ISO 180/1A |
| Izod Impact, notched 80*10*4 −30° C. | 8 | kJ/m$^2$ | ISO 180/1A |
| Izod Impact, notched 80*10*4 −30° C. | 8 | kJ/m$^2$ | ISO 180/1A |
| Charpy 23° C., V-notch Edge wise 80*10*4 sp = 62 mm | 12 | kJ/m$^2$ | ISO 179/1eA |
| Charpy −30° C., V-notch Edge wise 80*10*4 sp = 62 mm | 6 | kJ/m$^2$ | ISO 1791/eA |
| Charpy 23° C., Unnotch Edge wise 80*10*4 sp = 62 mm | NB | kJlm$^2$ | ISO 179/1eU |
| Charpy −30° C., Unnotch Edge wise 80*10*4 sp = 62 mm | 80 | kJ/m$^2$ | ISO 179/1eU |
| THERMAL | | | |
| Vicat Softening Temp, Rate B/50 | 295 | ° F. | ASTM D 1525 |
| HDT, 66 psi, 0.125", unannealed | 230 | ° F. | ASTM D 648 |
| HDT, 264 psi, 0.125", unannealed | 160 | ° F. | ASTM D 648 |
| CTE, flow, −40° F. to 100° F. | 5.50E−05 | 1/° F. | ASTM E 831 |
| CTE, xflow, −40° F. to 100° F. | 6.00E−05 | 1/° F. | ASTM E 831 |
| CTE, −40° C. to 40° C., flow | 9.90E−05 | 1i° C. | ISO 11359-2 |
| CTE, −40° C. to 40° C., xflow | 1.08E−04 | 1/° C. | ISO 11359-2 |
| Ball Pressure Test, 75° C. +/− 2° C. | — | | IEC 60695-10-2 |
| Vicat Softening Temp, Rate B/50 | 103 | ° C. | ISO 306 |
| Vicat Softening Temp, Rate B/120 | 107 | ° C. | ISO 306 |
| HDT/Af, 1.8 MPa Flatw 80*10*4 sp = 64 mm | 73 | ° C. | ISO 75/Af |
| PHYSICAL | | | |
| Specific Gravity | 0.99 | — | ASTM D 792 |
| Mold Shrinkage, flow, 0.125" | 0.6-0.8 | % | GE Method |
| Mold Shrinkage, xflow, 0.125" | 0.6-0.8 | % | GE Method |
| Melt Flow Rate, 260° C./5.0 kgf | 16 | g/10 min | ASTM D 1238 |
| Density | 0.03 | lb/in$^3$ | ISO 1183 |
| Water Absorption, equilibrium, 73° F. | 0.05 | % | ISO 62 |
| Moisture Absorption (23° C./50% RH) | 0.02 | % | ISO 62 |
| Melt Volume Rate, MVR at 260° C./5.0 kg | 18 | cm$^3$/10 min | ISO 1133 |

| PROCESSING PARAMETERS | TYPICAL VALUE | UNIT |
|---|---|---|
| Injection Molding | | |
| Drying Temperature | 140-150 | ° F. |
| Drying Time | 2-4 | Hrs |
| Drying Time (Cumulative) | 8 | Hrs |
| Maximum Moisture Content | 0.02 | % |
| Melt Temperature | 500-550 | ° F. |
| Nozzle Temperature | 500-550 | ° F. |
| Front - Zone 3 Temperature | 480-550 | ° F. |
| Middle - Zone 2 Temperature | 460-540 | ° F. |
| Rear - Zone I Temperature | 440-530 | ° F. |
| Mold Temperature | 90-120 | ° F. |
| Back Pressure | 50-100 | Psi |
| Screw Speed | 20-100 | Rpm |
| Shot to Cylinder Size | 30-70 | % |
| Vent Depth | 0.0015-0.002 | in |

[1]Typical values only. Variations within normal tolerances are possible for various colours. All values are measured at least after 48 hours storage at 230 C/50% relative humidity. All properties, expect the melt volume rate are measured on injection moulded samples. All samples are prepared according to ISO 294.
[2]Only typical data for material selection purposes. Not to be used for part or tool design.
[3]This rating is not intended to reflect hazards presented by this or any other material under actual fire conditions.
[4]Own measurement according to UL.

Figure 2:
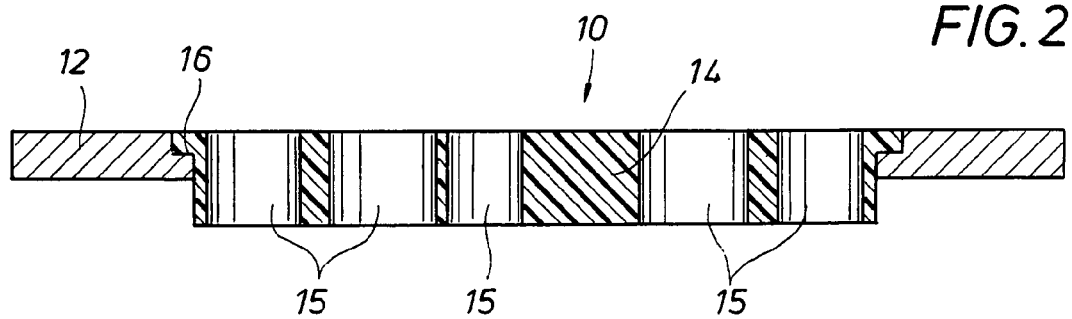
FIG. 2 is a sectional view taken along line 2-2 of FIG. 1.

The piping component could be any piping component where the internal metal body could be replaced with plastic or ceramic, or plastic or ceramic and metal body. For example, the piping component could be a flow conditioner, generally indicated as 10, in FIG. 1. The flow conditioner 10 includes a plastic profile body 14 having a plurality of apertures 15 fastened to an external steel housing 12 with a compression fit. In this embodiment the housing 12 could be heated pressed together with the body 14 and then allowed to cool. While the steel housing 12 in FIG. 1 is comprised of a ring, the steel housing could be any type of flange, casing, piping or a combination of these items. FIG. 2 shows the body 14 engaging a blocking shoulder 16 on the housing 12 to block further movement of the plastic profile body 14 during the compression fit.

FIGS. 3 through 14 show other ways to fasten a body to a housing. However, it is contemplated that there could be other ways to fasten the two parts together. In addition, more than one type of fastening could be used to fasten the body to the housing.

FIGS. 3 and 4 show a threaded connection between the body 14A, 14B of respective flow conditioner 10A, 10B and its respective steel housing 12A, 12B. FIG. 3 shows a threaded connection 18 between the body 14A and steel housing 12A. FIG. 4 is similar to FIG. 3, but shows an extended threaded connection 20 using a hub 21.

FIGS. 5 and 6 illustrate a set screw 22 between the body 14C of flow conditioner 10C and steel housing 12C. A threaded bore in the steel housing 12C receives set screw 22 that engages body 14C to fasten the body 14C to the steel housing 12C.

FIGS. 7 and 8 illustrate a radial set screw 24 for fastening the body 14D of flow conditioner 10D to the steel housing 12D. A radial threaded bore in the steel housing 12D receives set screw 24 in the steel housing 12D of the piping component to apply a compression force on the body 14D of the piping component.

FIGS. 9 and 10 show a snap ring 26 for fastening the body 14E of flow conditioner 10E to the steel housing 12E. FIG. 9 shows snap ring 26 fastening the body 14E to the steel housing 12E when received in groove 26A in the body 14E.

FIGS. 11 and 12 show a key 28 for fastening the body 14F of flow conditioner 10F to the steel housing 12F. Key 28 is slid into slot 28A in the body 14F and housing 12F to prevent rotation between the body 14F and the steel housing 12F.

FIGS. 13 and 14 illustrate the use of an adhesive 30 for fastening the body 14G of flow conditioner 10G to the steel housing 12G. The embodiment of FIGS. 13 and 14 without the bolt hole 32 has been actually reduced to practice and was manufactured for at least 30% less than the all-steel flow conditioner. The steel housing or ring 12G has equidistant bolt holes, such as bolt hole 32, as shown in FIG. 14. An exemplary epoxy adhesive is the SCOTCH-WELD® epoxy adhesive. Minnesota Mining and Manufacturing Company of St. Paul, Minn. reports the SCOTCH-WELD® Epoxy Adhesive DP420, is a high performance, two-part epoxy adhesive offering outstanding shear and peel adhesion, and very high levels of durability. It features high shear strength, high peel strength, outstanding environmental performance, easy mixing, controlled flow and a 20 minute worklife. Minnesota Mining and Manufacturing Company of St. Paul, Minn. further reports the typical cured thermal properties as follows:

Note: The following technical information and data should be considered representative or typical only and should not be used for specification purposes.

| Product | SCOTCH-WELD ® Epoxy Adhesive DP420 Off-White |
|---|---|
| Physical color | Opaque, off-white |
| Shore D Hardness | 75-80 |
| Thermal | |
| Coefficient of Thermal Expansion (in./in./° C.) | Below Tg  $85 \times 10^{-6}$<br>Above Tg  $147 \times 10^{-6}$ |
| Thermal Conductivity (btu - ft./ft.$^2$ - hr. - ° F.) @ 45° C. | 0.104 |
| Electrical Dielectric Strength (ASTM D 149) | 690 volts/mil |
| Volume Resistivity (ASTM D 257) | $1.3 \times 10^{14}$ ohm-cm |

Minnesota Mining and Manufacturing Company of St. Paul, Minn. reports the typical adhesive performance characteristics as follows:

Substrates and Testing:
A. Overlap Shear (ASTM D 1002-72)
  Overlap shear (OLS) strengths were measured on 1 in. wide ½ in. overlap specimens. These bonds made individually using 1 in.×4 in. pieces of substrate except for aluminum. Two panels 0.063 in. thick, 4 in.×7 in. of 2024T-3 clad aluminum were bonded and cut into 1 in. wide samples after 24 hours. The thickness of the bondline was 0.005-0.008 in. All strengths were measured at 73° F. (23° C.).
  The separation rate of the testing jaws was 0.1 in. per minute for metals, 2 in. per minute for plastics and 20 in. per minute for rubbers. The thickness of the substrates were: steel, 0.060 in.; other metals, 0.05-0.064 in.; rubbers, 0.125 in.; plastics, 0.125 in.

Epoxy Adhesive Off-White—Stainless steel MEK/abrade/MEK$^2$-4000.

B. T-peel (ASTM D 1876-61T)
T-peel strengths were measured on 1 in. wide bonds at 73° F. (23° C.). The testing jaw separation rate was 20 inches per minute. The substrates were 0.032 in. thick.

Epoxy Adhesive DP420 Off-White—Cold Rolled Steel—17-20 mil bondline Oakite degreased—40—MEK/abrade/MEK-25.

C. Other Substrates, Overlap Shear Tested @73° F.(23° C.)
Scotch-Weld Epoxy Adhesive DP420 Off-White
Surf. Prep. 1: Polycarbonate-400
Surf. Prep. 2: Polycarbonate-550

D. Environmental Resistance, Aluminum (Etched) Measured by Overlap Shear Tested @73° F.(23° C.) (PSI)$^1$ (ASTM D 1002-72)

| Environment | Condition | SCOTCH-WELD ® Epoxy Adhesive DP420 Off-White |
|---|---|---|
| 73° F. (23° C.)/ 50% RH | 30 d$^2$ | 5100 |
| Distilled Water | 30 d, i$^3$ | 4700 |
| Water Vapor | 120° F. (49° C.)/100% RH, 30 d | 4700 |
|  | 200° F. (93° C.)/100% RH, 14 d | 3000 |
| Antifreeze/H$_2$0 (50/50) | 180° F. (82° C.), 30 d, i | 4200 |
| Isopropyl Alcohol | 73° F. (23° C.), 30 d, i | 5300 |
| Methyl Ethyl Ketone | 73° F. (23° C.), 30 d, i | 4600 |
| Salt Spray (5%) | 95° F. (35° C.), 30 d | 5100 |
| Skydrol LD-4 | 150° F. (66° C.), 30 d, i | 5400 |

$^1$Data reported are actual values from the lots tested and may be higher than values published elsewhere.
$^2$d = days
$^3$i—immersion The above SCOTCH-WELD® data was published by 3M Industrial Business—Industrial Adhesives and Tapes Division, 3M Center, Building 21-1W-10, 900 Bush Avenue, St. Paul, Minn. 55144-1000, ©3M March, 2004. SCOTCH-WELD is a federally registered trademark of the Minnesota Mining and Manufacturing Company of St. Paul, Minn.

Figure 15:
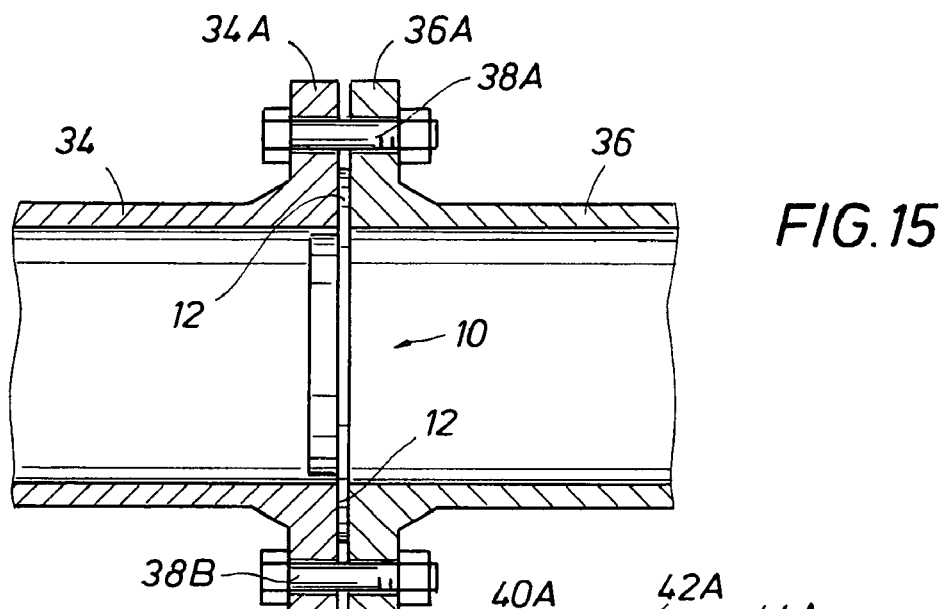
FIG. 15 is a sectional view of a piping component positioned between piping flanges.
Figure 16:
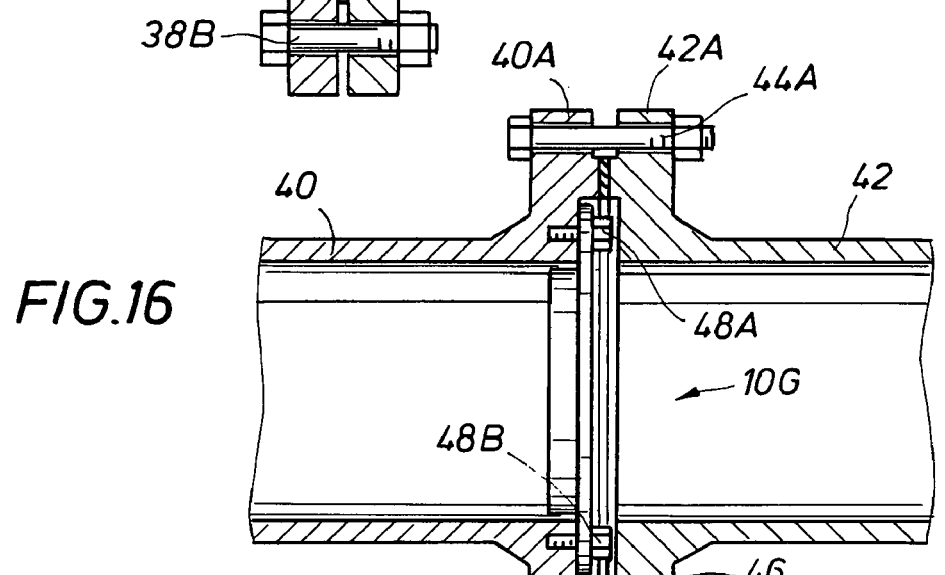
FIG. 16 is a sectional view, similar to FIG. 15, of a piping component positioned between recesses in piping flanges using a plurality of bolts and sealed by a gasket.
Figure 17:
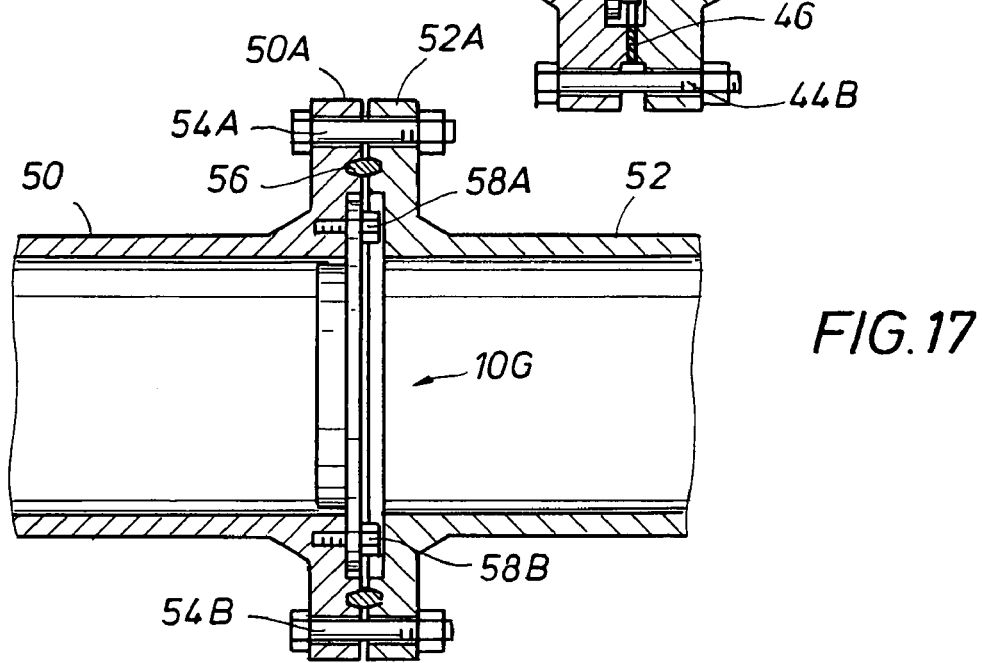
FIG. 17 is a sectional view, similar to FIG. 16, of a piping component positioned between pipe flanges using a metal-to-metal seal instead of a gasket.

FIGS. 15, 16, and 17 illustrate flow conditioner piping component 10, 10G positioned with a steel pipe. FIG. 15 illustrates flow conditioner 10 steel flange 12 between a pair of pipe flanges 34A, 36A of respective steel pipe 34, 36. Bolts, such as bolts 38A, 38B, are spaced equidistant about the pipe flanges 34A, 36A and torqued to ASME standards to hold the flow conditioner 10 between the pipe 34, 36.

FIG. 16 illustrates flow conditioner 10G steel flange 12G set between a pair of flanges 40A, 42A of respective steel pipe 40, 42. Flow conditioner bolts, such as bolts 48A, 48B, are fastened into holes, such as hole 32 shown in FIG. 14, in the recess of downstream pipe flange 40A. In addition, a gasket 46 seals the flanges 40A, 42A. Similar to the FIG. 15, bolts, such as bolts 44A, 44B, are spaced equidistant about the flanges 40A, 42A and torqued to ASME standards.

FIG. 17 illustrates a flow conditioner 10G steel flange 12G with bolts, such as bolts 58A, 58B, that are threaded into a recess in the downstream pipe flange 50A. A metal-to-metal seal 56 seals the pipe flanges 50A, 52A, and bolts, such as bolts 54A, 54B, are spaced equidistant and torqued as directed by ASME standards to join the steel pipe 50, 52.

FIGS. 18, 19, 20, and 21 illustrate ways that body 14H, 14I, 14J and 14K of respective flow conditioner 10H, 10I, 10J, and 10K in rings 12H, 12I, 12J, and 12K can be formed when fabricated from plastic. The direction of fluid flow F is indicated by an arrow on these FIGS. The upstream face 14H', 14I', 14J', and 14K' on the body of the flow conditioners receive the fluid flow F, and the fluid flow F exits from the respective downstream face 14H", 14I", 14J", and 14K".

FIG. 18 shows the body 14H with a concave downstream face 14H". FIG. 19 shows the body 14I with a convex downstream face 14I". FIG. 20 shows the body 14J having a concave step downstream face 14J". FIG. 21 shows the body 14K having a convex step downstream face 14K". While FIGS. 18 to 21 illustrate forming the downstream face, it is contemplated that the upstream face 14H', 14I', 14J', and 14K' could also be formed in a variety of configurations. Furthermore, while these FIGS. show the body 14H, 14I, 14J, 14K of a flow conditioner piping component, it is contemplated that the bodies of other piping components could also be formed in a variety of configurations because the plastic discovered is relatively inexpensive to form.

Figure 22:
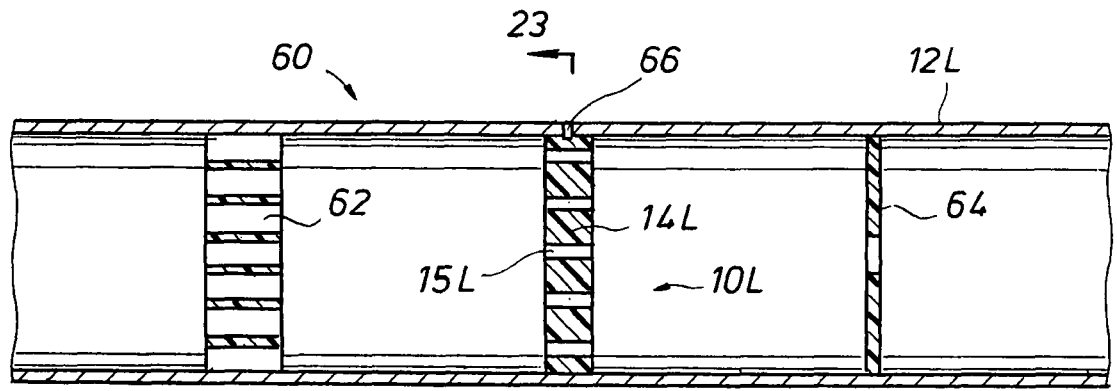
FIG. 22 is a sectional view of a flow conditioner piping component positioned between an anti-swirl device and a measuring device.
Figure 23:
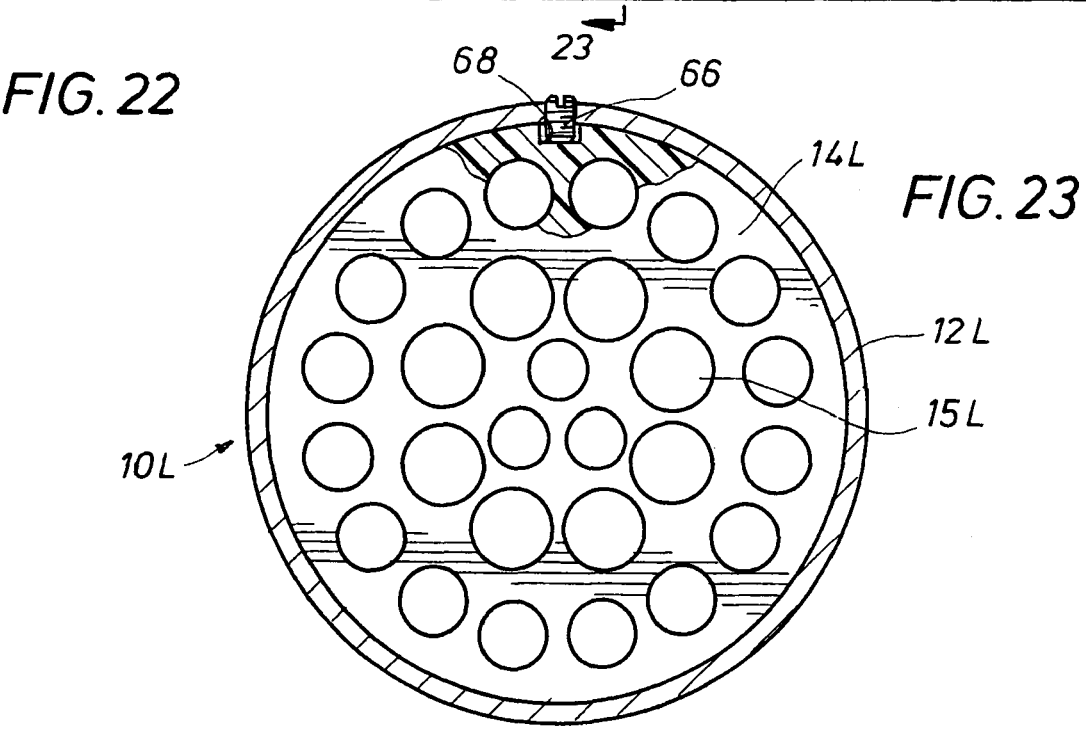
FIG. 23 is a sectional view of the flow conditioner piping component taken along lines 23-23 of FIG. 22, with a portion of the flow conditioner cut away to show a set screw connection.

FIG. 22 illustrates a system for conditioning fluid. An anti-swirl device 62 piping component is placed upstream in a steel pipe 60 from a flow conditioner 10L having a plurality of apertures 15L and a measurement device 64. An enlarged section view of the flow conditioner 10L in FIG. 23 best shows set screw 66 threaded through an aperture in the steel housing 12L into a recess 68 in plastic body 14L so that the body 14L is fastened to the steel housing 12L of steel pipe 60. The body 14L of FIG. 23 has been actually reduced to practice and was manufactured for at least 50% less than an all-steel body.

Figures 24, 25, 26:
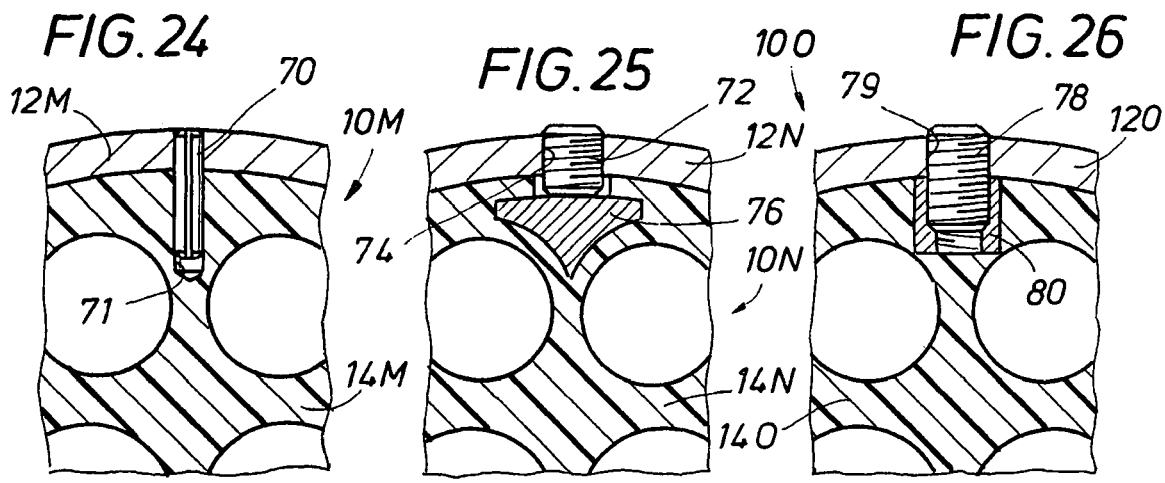
FIG. 24 is an enlarged detailed sectional view of a piping component body connected to a steel pipe using a roll pin.
FIG. 25 is an enlarged detailed sectional view of a piping component body connected to a steel pipe using a set screw that contacts a metal insert positioned within the plastic piping component body.
FIG. 26 is an enlarged detailed sectional view of a piping component body connected to a steel pipe using a set screw that is threaded with a casing positioned in the plastic piping component body.

FIGS. 24 to 26 illustrate alternative fastening of flow conditioner 10M, 10N, and 10O to steel housing 12M, 12N, and 12O provided by a steel pipe. FIG. 24 shows an aperture through steel housing 12M which aligns with aperture 71 in the flow conditioner 10M body 14M to receive expandable roll pin 70.

Turning to FIG. 25, a threaded aperture 74 in the steel housing 12N of the flow conditioner 10N receives set screw 72. Screw 72 engages metallic support 76 in plastic body 14N to distribute the force applied by screw 72. The flow conditioner 10O in FIG. 26 illustrates a metal casing 80 with inwardly threads positioned in the plastic body 14O. The screw 78 is received through an aperture 79 in the steel housing 12O and threadly engages the casing 80. Other fastening means are contemplated for fastening a flow conditioner into a housing, such as a pipe.

Figure 27:
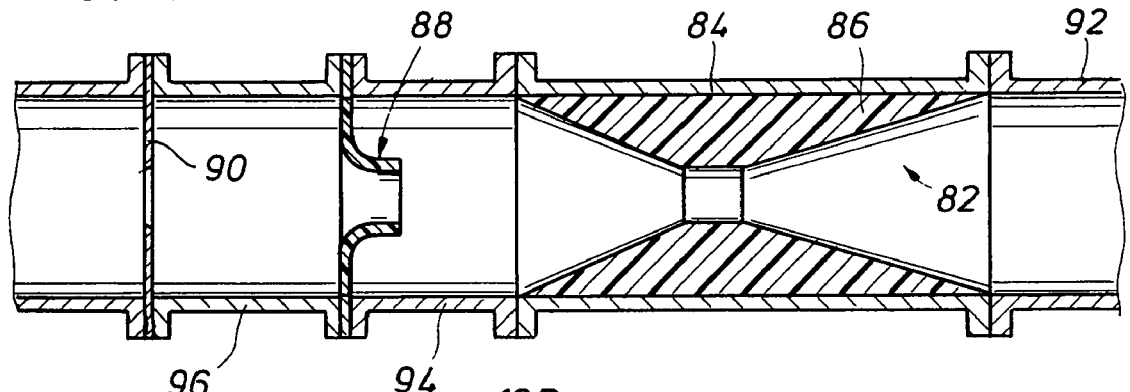
FIG. 27 is a sectional view of a venturi nozzle positioned between a measuring device and a venturi flowmeter according to one embodiment of the invention wherein the venturi flowmeter and nozzle having a plastic body positioned in a steel housing.
Figure 28:
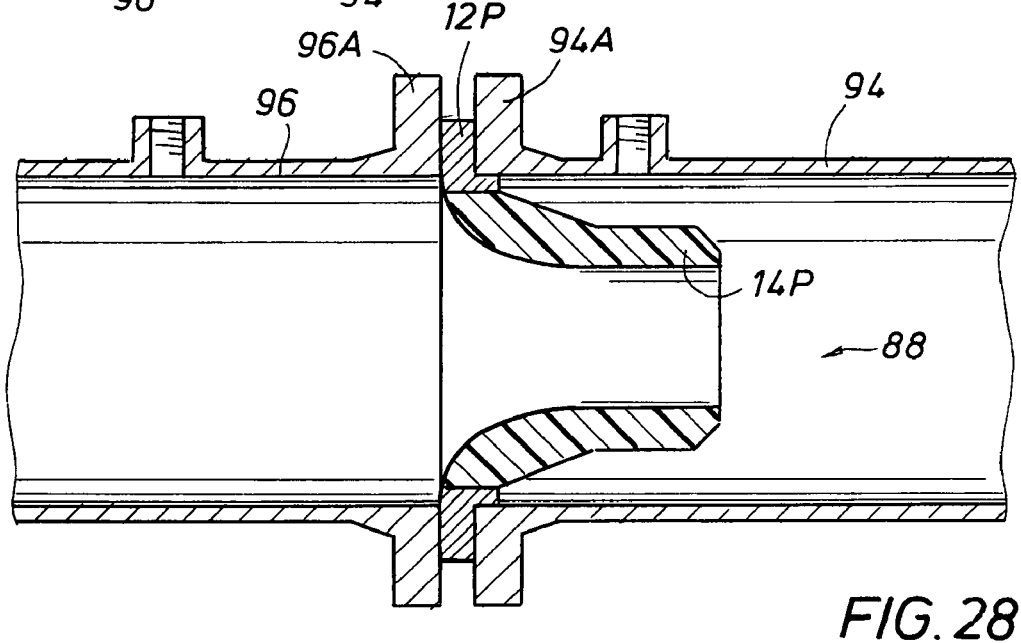
FIG. 28 is an enlarged detailed sectional view of the flow nozzle of FIG. 27.

FIG. 27 illustrates several piping components, generally indicated at 88, 82, embodying the present invention to drop the pressure in a piping system. Flow nozzle 88, which is shown in detail in FIG. 28, is positioned between a flow meter 90 and a venturi flowmeter 82. Both the flow nozzle 88 and venturi flowmeter 82 have respective steel casings 12P, 84 and plastic bodies 14P, 86. As best shown in FIG. 28, the flanges 94A, 96A of respective steel pipe 94, 96 hold the steel housing 12P to give the piping system the required DOT continuous steel connection with the plastic body 14P of the flow nozzle 88 within the pipe 94, 96. Other venturi nozzles, such as distributed by Canada Pipeline Accessories of Calgary, Alberta, Canada, are contemplated for use with the multiple materials of the present invention.

Figure 29:
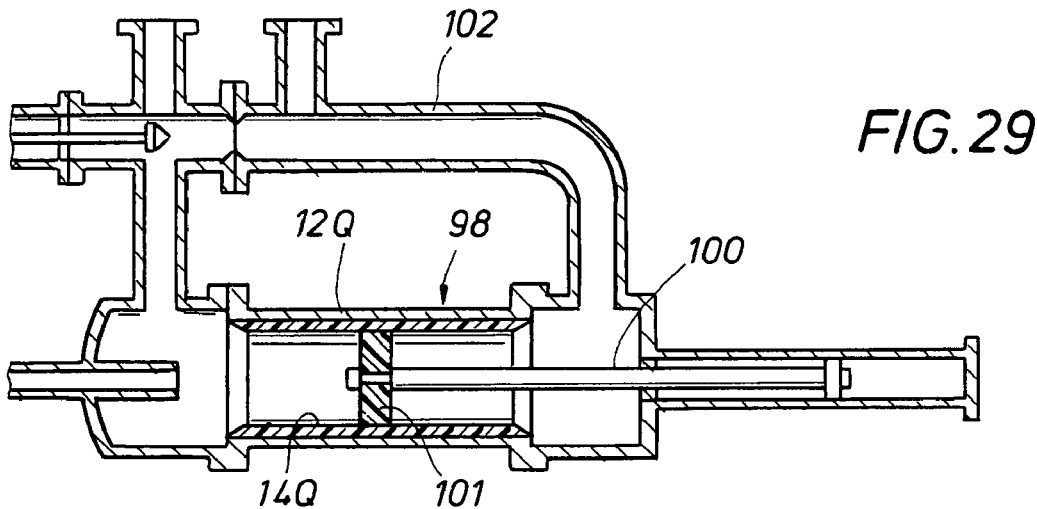
FIG. 29 is a sectional view of a small volume prover according to one embodiment of the invention having an internal plastic body radially positioned about the plastic valve both positioned in a steel housing.

FIG. 29 illustrates a small volume prover, generally indicated at 98, according to the present invention wherein the solenoids and hydraulic system, which is collectively the body 14Q, are fabricated from plastic. The body 14Q of the small volume prover 98 is contained within the steel housing 12Q, and operates when the bypass valve 102 is opened to fill the chamber, and the piston assembly 100 having a plastic member 101 is fully extended. When the bypass valve 102 is sealed, fluid flows past the piston assembly 100, and fluid measurement is achieved. Examples of other small volume provers are proposed in U.S. Pat. Nos. 3,421,360; 3,673,851; 3,877,287; 4,152,922 and 4,627,267.

Figure 30:
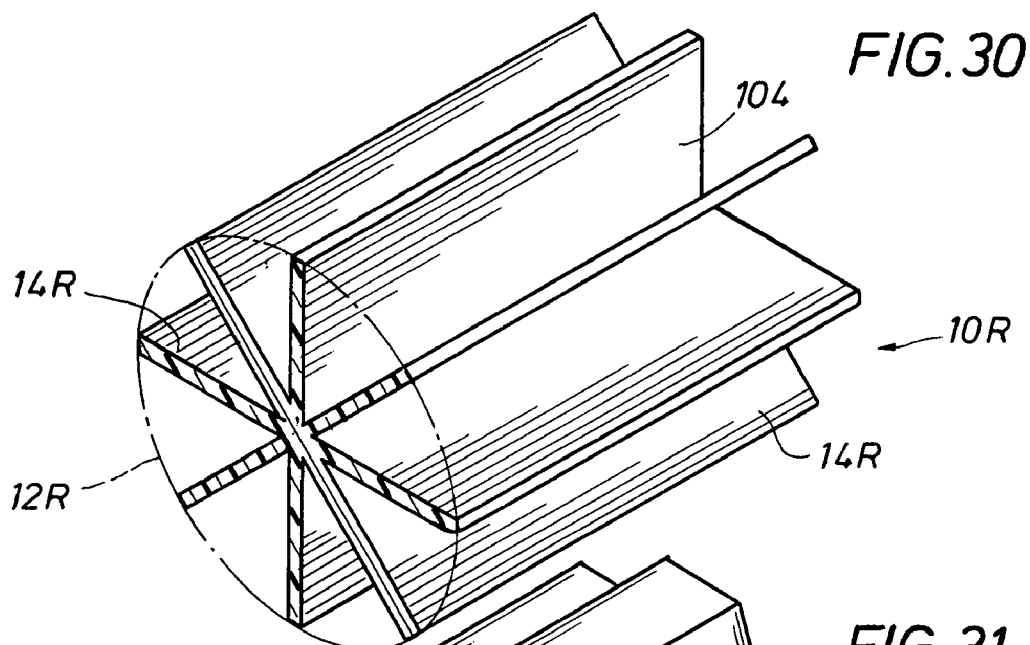
FIG. 30 is a perspective view of a flow conditioner according to one embodiment of the invention having a plastic body comprised of a plurality of equidistant spaced vanes positionable in a steel housing, such as shown in FIG. 22, the outline of which is shown in phantom view.
Figure 31:
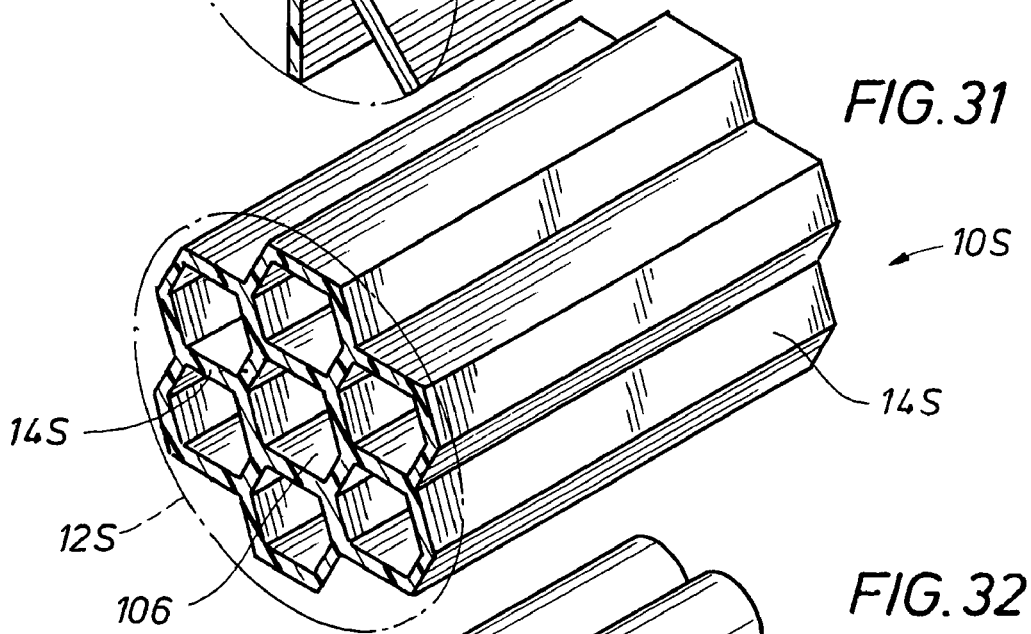
FIG. 31 is a perspective view of a flow conditioner according to one embodiment of the invention having a plurality of honeycomb shaped plastic bodies positionable in a steel housing, such as shown in FIG. 22, the outline of which is shown in phantom view.
Figure 32:
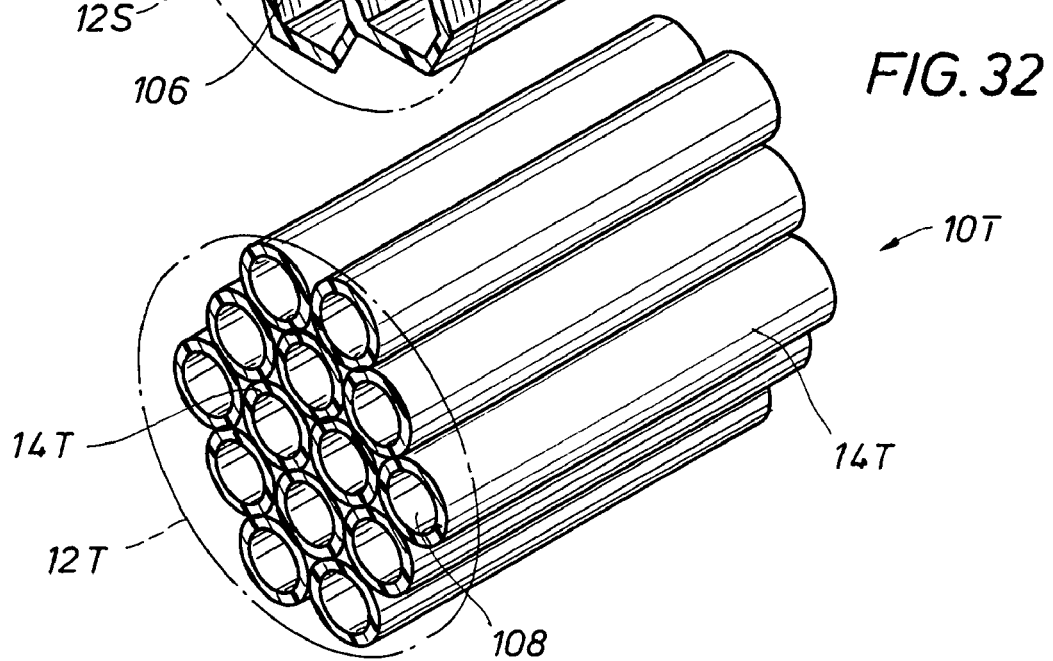
FIG. 32 is a perspective view of a flow conditioner according to one embodiment of the invention having a plastic body comprising a bundle of tubes positionable in a steel housing, such as shown in FIG. 22, the outline of which is shown in phantom view.

FIGS. 30 to 32 illustrate flow conditioners 10R, 10S, and 10T having respective bodies 14R, 14S, and 14T extruded or molded from plastic. A pipe, indicated in phantom view 12R, 12S and 12T, is contemplated to encase the plastic bodies 14R, 14S and 14T. In FIG. 30, the body 14R includes a plurality of equidistant spaced vanes 104. In FIG. 31, the body 14S is configured in a honeycomb 106 and in FIG. 32, the body 14S is formed from a bundle of tubes 108. It is contemplated that a variety of other shapes could be fabricated because plastic is inexpensively extruded and/or molded.

Figure 33:
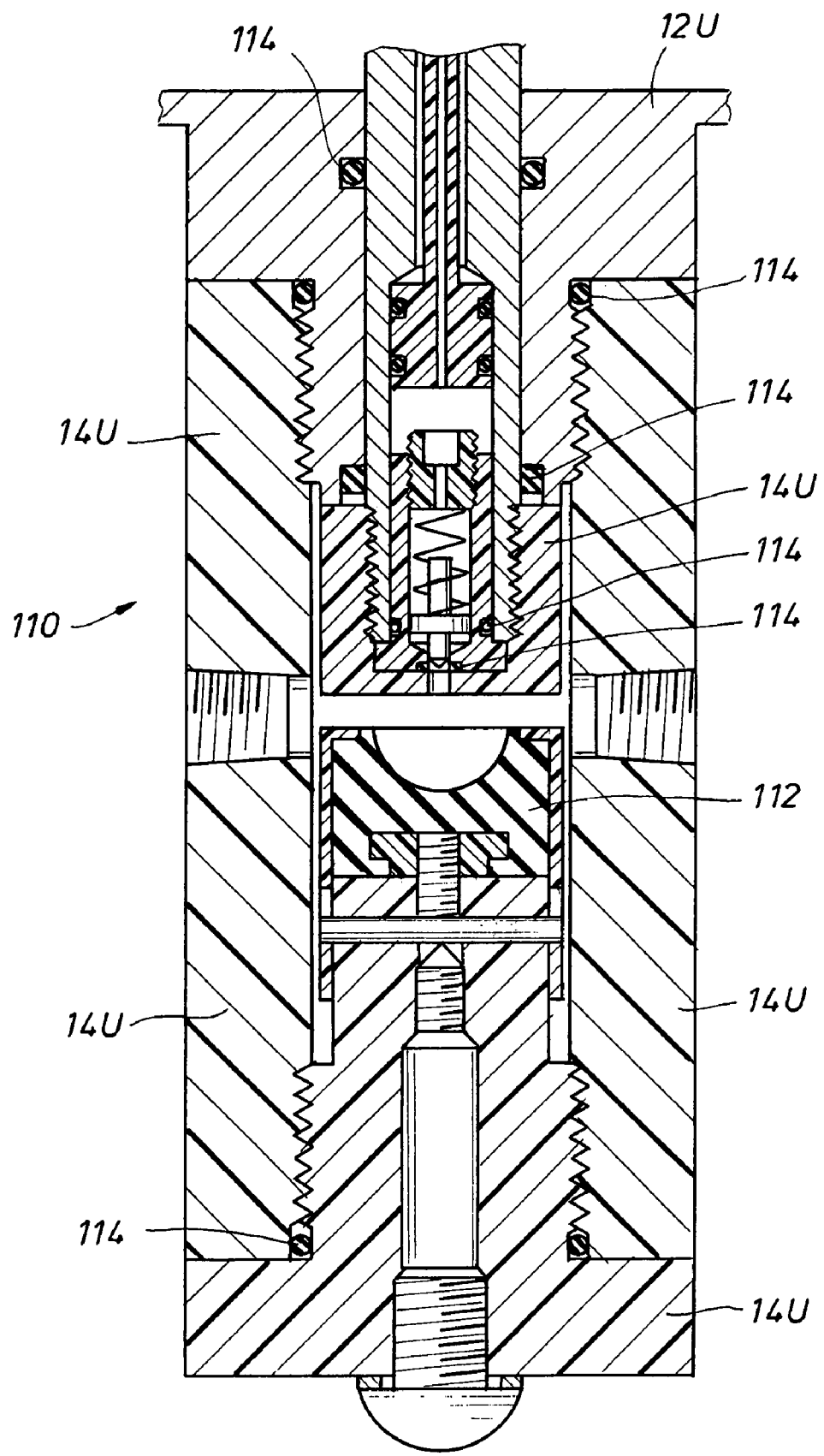
FIG. 33 is a sectional view of a sampler according to one embodiment of the invention having a plastic body threadedly positioned with a metal housing.

FIG. 33 illustrates a sampler 110 piping component, wherein plastic body 14U is threaded onto the steel casing 12U. The plastic body 14U of the sampler 110 extending from the steel casing 12U replaces the steel components as proposed in U.S. Pat. Nos. 3,945,770 and 4,403,518, which patents are incorporated herein in their entirety by reference for all purposes. The collection head 112, traditionally fabricated from rubber, provides resiliency, as does elastomer sealing members 114. Sampler 110 illustrates how multiple non-steel materials could be used to fabricate the body of a piping component extending from a pipe. However, it is also envisioned that non-metallic materials, such as plastic and rubber, could also be combined with metallic materials, such as steel, to form the body of piping components.

Figure 34:
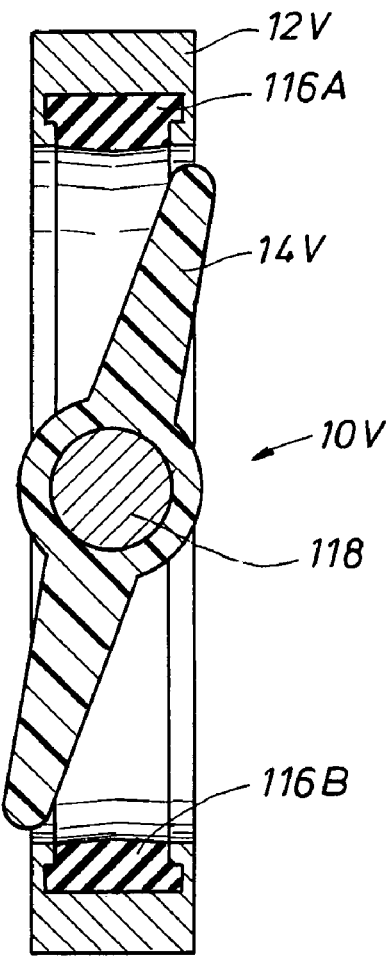
FIG. 34 is a plan sectional view of a butterfly valve according to one embodiment of the invention having a plastic valve body positioned in a metal housing.

Yet another embodiment of a piping component according to this invention is a valve 10V shown in FIG. 34. Butterfly valve 10V includes a steel housing 12V which contains a plastic butterfly body 14V that rotates about axial member 118 moved either via actuator or by hand. The body 14V aligns with the opposed elastomer seals 116A, 116B to close the valve 10V. The axial member 118 is fabricated from steel similar to housing 12V to maintain all steel containment per DOT regulations. Other types of valves are contemplated to be comprised of the multiple materials of the present invention.

Figure 35:
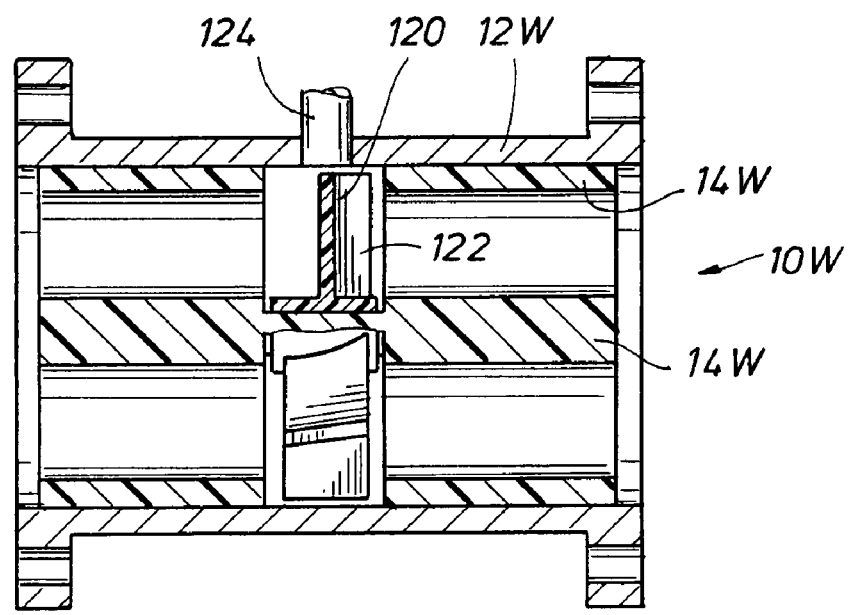
FIG. 35 is a sectional view of a turbine flowmeter according to one embodiment of the invention having a plastic body positioned in a metal housing.

A turbine flowmeter 10W, illustrated in FIG. 35, includes a plastic flow tube body 14W with plastic propeller or turbine blades 120 mounted on bearings coaxially inside. Magnets 122 could be fastened onto the turbine blades 120 so that angular velocity can be determined from outside the steel housing 12W by a sensor 124. Other types of flowmeters are contemplated to be comprised of the multiple materials of the present invention.

Figure 36:
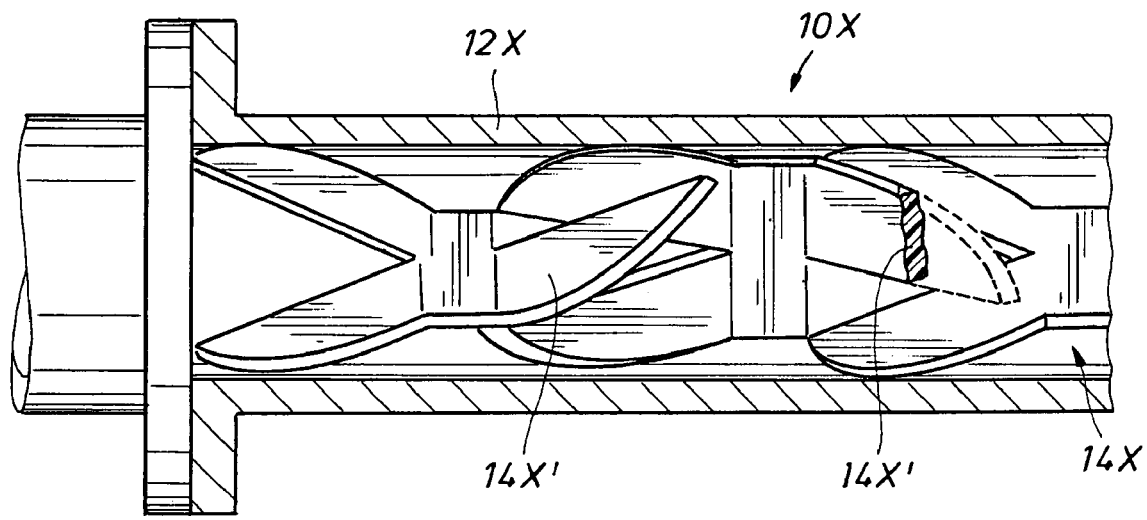
FIG. 36 is a sectional view of a static mixer according to one embodiment of the invention wherein the plastic body is positioned within a metal housing.
Figure 37:
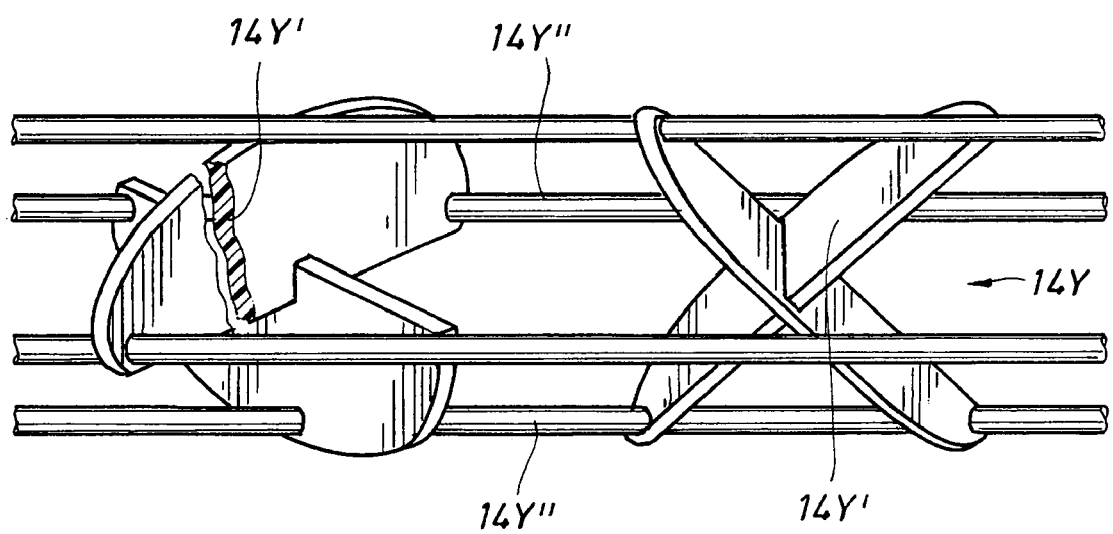
FIG. 37 is a sectional view of another static mixer according to one embodiment of the invention wherein the plastic body is positionable within a metal housing, such as shown in FIG. 36.
Figure 38:
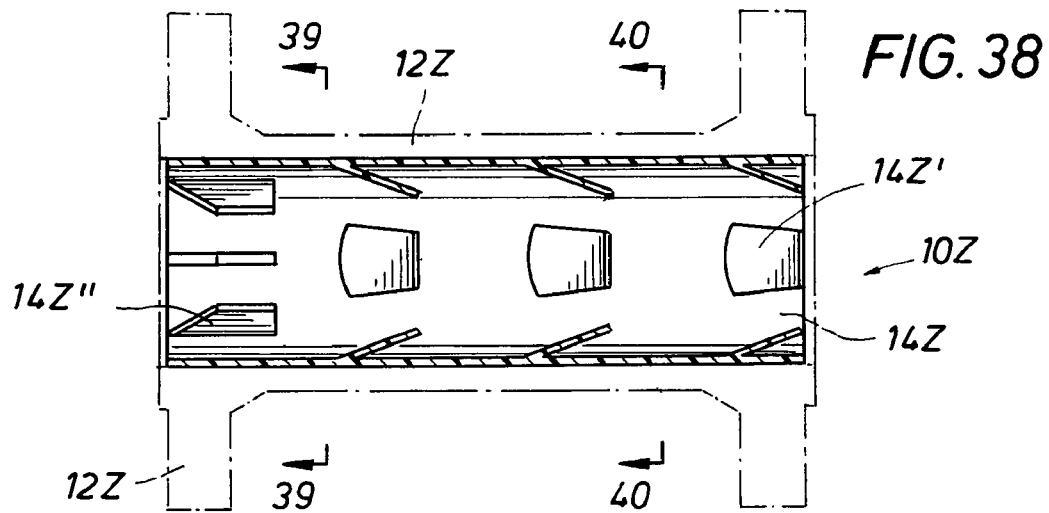
FIG. 38 is a sectional view of a flow conditioner according to one embodiment of the invention wherein the insertion sleeve or plastic body comprises plastic flaps and fins wherein the body is epoxied to a steel housing or spool shown in phantom view.
Figure 39:
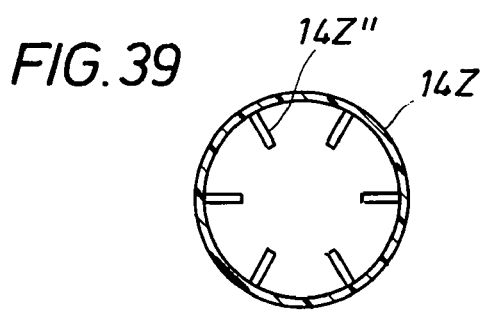
FIG. 39 is a section view taken along lines 39-39 of the flow conditioner body of FIG. 38 to better show the plurality of plastic fins.
Figure 40:
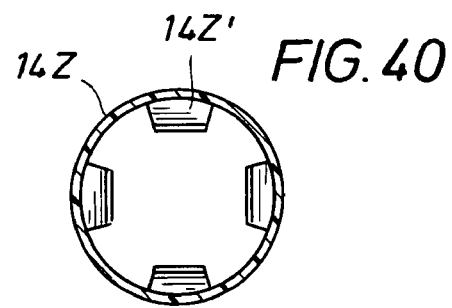
FIG. 40 is a section view taken along lines 40-40 of the flow conditioner body of FIG. 38 to better show the plastic flaps.
Figure 41:
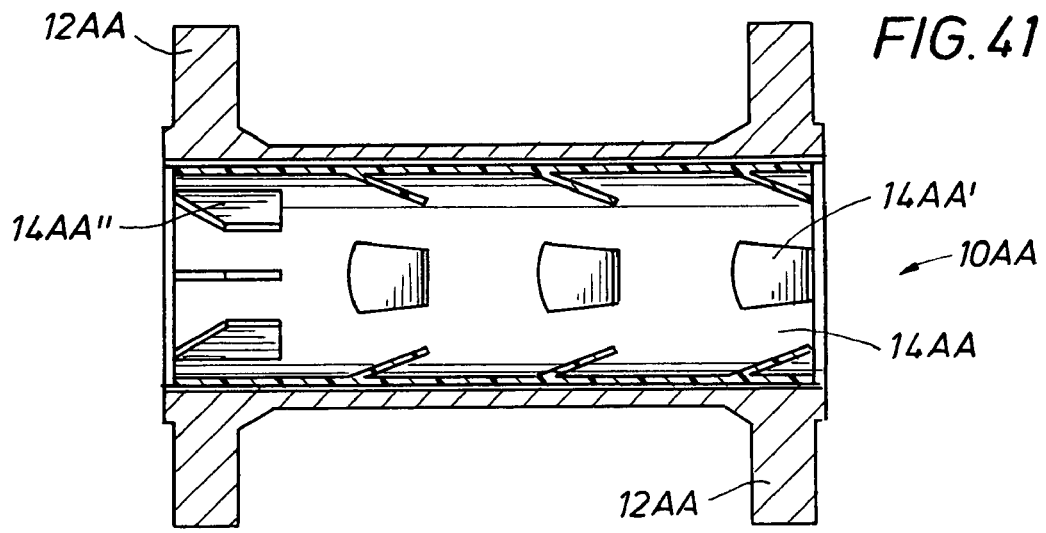
FIG. 41 is a sectional view of a flow conditioner according to one embodiment of the invention wherein the plastic body comprises plastic flaps and fins and is epoxied to a steel housing or spool.

FIGS. 36 and 37 illustrate static mixer plates 14X', 14Y' piping components. The static mixer 10X in FIG. 36 is mounted within a steel housing 12X while a plurality of semi-elliptical plates 14X' form the body, generally indicated at 14X, which serve to mix fluid passing through the piping component. FIG. 37 illustrates a plurality of rods 14Y" threaded through plates 14Y' to form the body, generally indicated at 14Y. Plastic body 14Y can be positioned within a steel pipe, similar to steel housing 12X in FIG. 36. It is contemplated that the other static mixes proposed in the above identified U.S. Patents could be comprised of the multiple materials of the present invention.

Additional piping components include the flow conditioners 10Z, 10AA depicted in FIGS. 38 to 41. Flaps 14Z' and fins 14Z" of insertion sleeve or body 14Z can be fastened to the steel housing 12Z using any of the fastening means discussed above. Also, the fins 14AA" and flaps 14AA' of the insertion body 14AA can be easily formed from plastic. It is also contemplated that the flaps and fins illustrated in FIGS. 38 to 41 could be fabricated from plastic and fastened directly to the steel housing by any of the fastening means discussed above, including epoxy adhesive.

Figure 42:
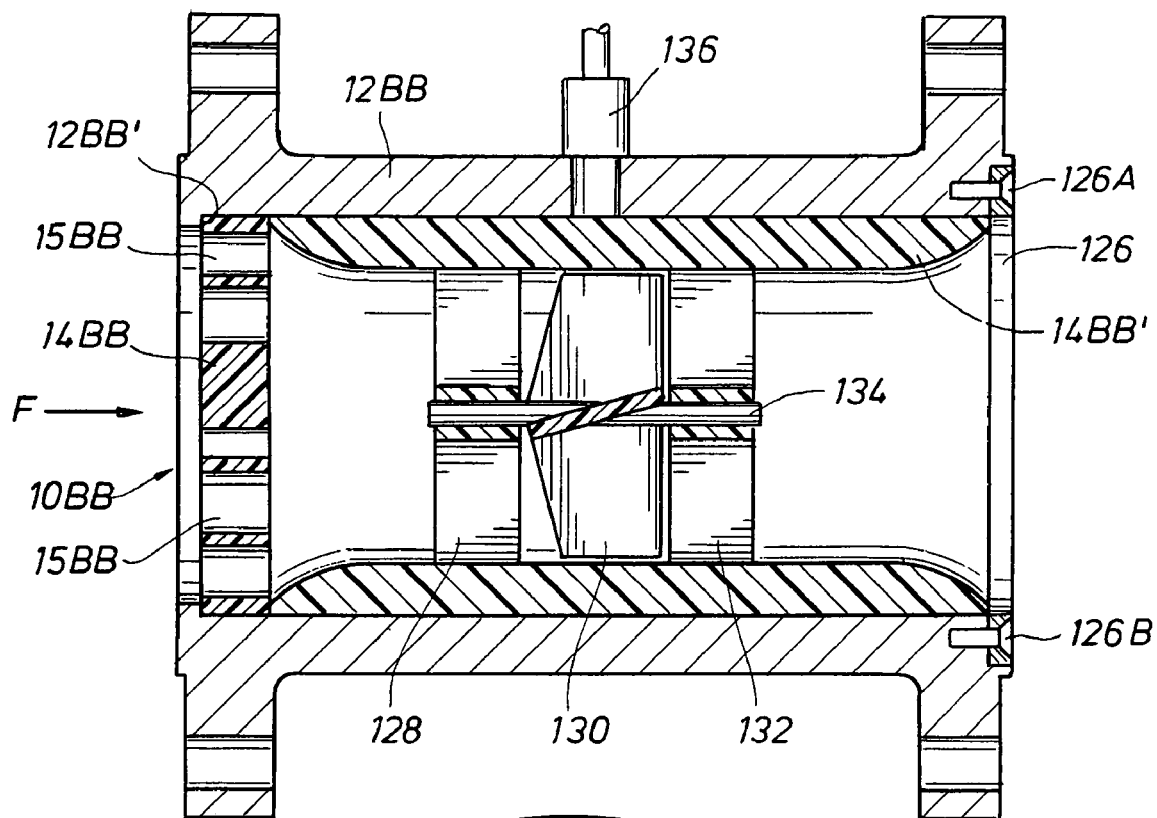
FIG. 42 is a sectional view of a flowmeter according to one embodiment of the invention wherein an all plastic flow conditioner is held in place in the steel piping by an elongated plastic body positioned about an assembly comprising a plastic rotor, multiple plastic stators, and a shaft with bearings.
Figure 43:
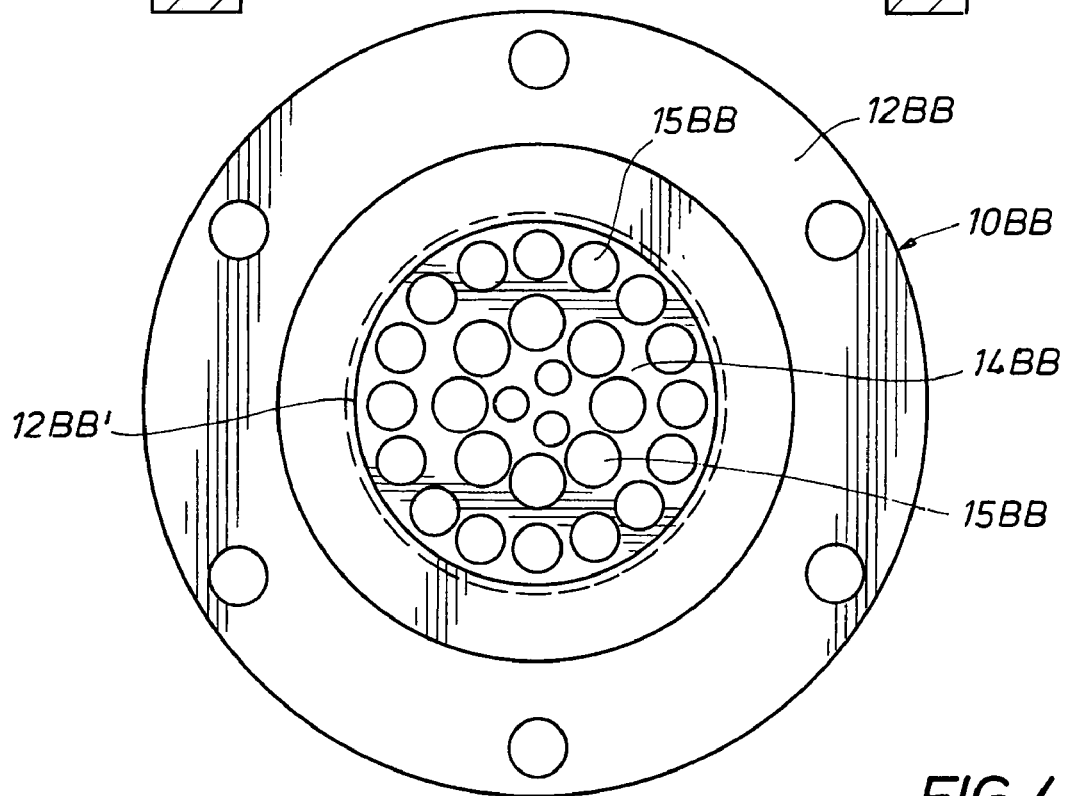
FIG. 43 is a front elevational view of the plastic flow conditioner in FIG. 42 held in place in the steel piping.

Yet another piping component includes a flowmeter as shown in FIG. 42 having a flow conditioner, generally indicated at 10BB, having a body 14BB, preferably fabricated from plastic, having apertures 15BB. As best shown in FIGS. 42 and 43, the plastic body 14BB is moved through the steel piping 12BB until blocked by shoulder 12BB'. An elongated plastic contoured contraction body 14BB' is then positioned in the steel piping 12BB. A plastic rotor 130 between plastic stators 128, 132 on a shaft 134 with bearings is positioned with the elongated body 14BB'. A waffle compression ring 126 is bolted by bolts, such as bolts 126A and 126B, to the steel body 12BB. A pick-up coil and preamp 136 is positioned on the steel body 12BB as is known in the industry.

While Faure Herman Meter, Inc. of Houston, Tex. provides an all steel flowmeter similar in configuration to the flowmeter shown in FIGS. 42 and 43, it is contemplated that some or all of the following components, as shown in FIGS. 42 and 43, could be fabricated from plastic: body 14BB, elongated body 14BB', stators 128, 132, and rotor 130.

Methods of Manufacture

Methods of manufacture include machining the steel housing, as is traditional, and fastening the formed non-metallic body into the housing. The non-metallic body, preferably fabricated from the NORYL PPX® Resin PPS7200 disclosed in detail above, is best fabricated by injection molding. However, as size increases over a foot, it may be necessary to machine plastic sheets. The sheet form, preferably fabricated from NORYL PPX® PPX7112 Resin (polyphenylene ether+ PS+PP), is distributed by GE Plastics and sold by GE Polymershapes of South Houston, Tex. Yet another contemplated method of manufacturing the plastic body of a piping component is by blow molding.

It is contemplated that the non-metallic body of the piping component may require certain metal parts. Therefore, it is possible to manufacture a piping component body with both non-metal and metal parts. It is also foreseeable to have multiple types of non-metal parts, such as plastic, ceramic and rubber, in the piping component.

While as discussed above in detail, it is contemplated that fastening the body to the metal housing could be done in a variety of ways, the SCOTCH-WELD® epoxy adhesive, such as disclosed above in detail, is preferred to fasten the plastic body to the metal housing.

The foregoing disclosure and description of the invention are illustrative and explanatory thereof, and various changes in the details of the illustrated apparatus and system, and the construction and the method of operation may be made without departing from the spirit of the invention.

We claim:

1. A piping component, comprising:
a metal flange having an opening;
a body fabricated from a non-metal material and positioned with said flange opening;
an upstream face on said body;
a downstream face on said body; and
a plurality of substantially circular spaced apart apertures extending between said body upstream face and said body downstream face in predetermined locations;
wherein one of said body faces being substantially flat; and
wherein one of the faces on said body is substantially convex shaped.

2. A piping component, comprising:
a metal flange having an opening;
a body fabricated from a non-metal material and positioned with said flange opening;
an upstream face on said body;
a downstream face on said body; and
a plurality of substantially circular spaced apart apertures extending between said body upstream face and said body downstream face in predetermined locations;
wherein one of said body faces being substantially flat; and
wherein one of the faces on said body is step shaped.

3. A piping component, comprising
a metal flange having an opening;
a body fabricated from a non-metal material and positioned with said flange opening;
an upstream face on said body;
a downstream face on said body; and
a plurality of substantially circular spaced apart apertures extending between said body upstream face and said body downstream face in predetermined locations;
wherein one of said body faces being substantially flat; and
wherein said body is fastened to said metal flange by an epoxy adhesive.

4. A piping component, comprising:
a metal flange having an opening;
a body fabricated from a non-metal material and positioned with said flange opening;
an upstream face on said body;
a downstream face on said body; and
a plurality of substantially circular spaced apart apertures extending between said body upstream face and said body downstream face in predetermined locations;
wherein one of said body faces being substantially flat; and
wherein said body is fastened to said metal flange by a set screw.

5. A piping component, comprising:
a metal flange having an opening;
a body fabricated from a non-metal material and positioned with said flange opening;
an upstream face on said body;
a downstream face on said body; and
a plurality of substantially circular spaced apart apertures extending between said body upstream face and said body downstream face in predetermined locations;
wherein one of said body faces being substantially flat; and
wherein said body is fastened to said metal flange by a key.

6. A piping component, comprising:
a metal flange having an opening;
a body fabricated from a non-metal material and positioned with said flange opening;
an upstream face on said body;
a downstream face on said body; and
a plurality of substantially circular spaced apart apertures extending between said body upstream face and said body downstream face in predetermined locations;
wherein one of said body faces being substantially flat; and
wherein said body is fastened to said metal flange by a pin.

7. A method of manufacturing a flow conditioner, comprising the steps of:
providing a metal housing having an opening;
forming a body having an upstream face and a downstream face and fabricated from a non-metal material that can withstand a fluid requiring steel containment;
positioning said body at least in part within said metal housing opening; and
fastening said body to said housing by an epoxy adhesive;
wherein one of said body faces being substantially flat; and wherein said body having a plurality of substantially circular spaced apart apertures extending through said body.

8. A method of manufacturing a flow conditioner, comprising the steps of:
providing a metal housing having an opening;
forming a body having an upstream face and a downstream face and fabricated from a non-metal material that can withstand a fluid requiring steel containment;
positioning said body at least in part within said metal housing opening; and
fastening said body to said housing a two part-epoxy adhesive that has a high shear and peel adhesion, and is durable in corrosive environments;
wherein one of said body faces being substantially flat; and
wherein said body having a plurality of substantially circular spaced apart apertures extending through said body.

9. A method of manufacturing a flow conditioner, comprising the steps of:
providing a metal housing having an opening;
forming a body having an upstream face and a downstream face and fabricated from a non-metal material that can withstand a fluid requiring steel containment;
positioning said body at least in part within said metal housing opening; and
fastening said body to said housing by a set screw;
wherein one of said body faces being substantially flat; and
wherein said body having a plurality of substantially circular spaced apart apertures extending through said body.

10. A method of manufacturing a flow conditioner, comprising the steps of:
providing a metal housing having an opening;
forming a body having an upstream face and a downstream face and fabricated from a non-metal material that can withstand a fluid requiring steel containment;
positioning said body at least in part within said metal housing opening; and
fastening said body to said housing by a key;
wherein one of said body faces being substantially flat; and
wherein said body having a plurality of substantially circular spaced apart apertures extending through said body.

11. A method of manufacturing a flow conditioner, comprising the steps of:
providing a metal housing having an opening;
forming a body having an upstream face and a downstream face and fabricated from a non-metal material that can withstand a fluid requiring steel containment;
positioning said body at least in part within said metal housing opening; and
fastening said body to said housing by a
wherein one of said body faces being substantially flat; and
wherein said body having a plurality of substantially circular spaced apart apertures extending through said body.

12. A piping system, comprising:
a steel pipe;
a piping component releasably connected to said steel pipe, said piping component including:
a steel housing having an opening, said steel housing connecting with said steel pipe so that said steel housing opening is within said steel pipe; and
a body fabricated from a non-steel material and positioned with said steel housing opening so that said body does not directly contact said steel pipe while being positioned within said steel pipe;
wherein said body being fixed relative to said steel pipe;
wherein said body having a plurality of substantially circular spaced apart apertures extending through said body; and
wherein said non-steel material is attached with said steel housing with an epoxy adhesive.

13. A piping system, comprising:
a steel pipe; and
a piping component releasably connected to said steel pipe, said piping component including:
a steel housing having an opening, said steel housing connecting with said steel pipe so that said steel housing opening is within said steel pipe; and
a body fabricated from a non-steel material and positioned with said steel housing opening so that said body does not directly contact said steel pipe while being positioned within said steel pipe;
wherein said body being fixed relative to said steel pipe;
wherein said body having a plurality of substantially circular spaced apart apertures extending through said body; and
wherein said body having at least two faces and one of said faces on said body is convex shaped.

14. A piping system, comprising:
a steel pipe; and
a piping component releasably connected to said steel pipe, said piping component including:
a steel housing having an opening, said steel housing connecting with said steel pipe so that said steel housing opening is within said steel pipe; and
a body fabricated from a non-steel material and positioned with said steel housing opening so that said body does not directly contact said steel pipe while being positioned within said steel pipe;
wherein said body being fixed relative to said steel pipe;
wherein said body having a plurality of substantially circular spaced apart apertures extending through said body; and
wherein said body having at least two faces and one of said faces on said body is step shaped.

15. A piping system, comprising:
a steel pipe; and
a piping component releasably connected to said steel pipe, said piping component including:
a steel housing having an opening, said steel housing connecting with said steel pipe so that said steel housing opening is within said steel pipe; and
a body fabricated from a non-steel material and positioned with said steel housing opening so that said body does not directly contact said steel pipe while being positioned within said steel pipe;
wherein said body being fixed relative to said steel pipe;
wherein said body having a plurality of substantially circular spaced apart apertures extending through said body; and
wherein said body is fastened to said steel housing by adhesive.

16. A piping system, comprising:
a steel pipe; and
a piping component releasably connected to said steel pipe, said piping component including:
a steel housing having an opening, said steel housing connecting with said steel pipe so that said steel housing opening is within said steel pipe; and a body fabricated from a non-steel material and positioned with said steel housing opening so that said body does not directly contact said steel pipe while being positioned within said steel pipe;

wherein said body being fixed relative to said steel pipe;

wherein said body having a plurality of substantially circular spaced apart apertures extending through said body; and wherein said body is fastened to said steel housing by a set screw.

17. A piping system, comprising:

a steel pipe; and a piping component releasably connected to said steel pipe, said piping component including:
- a steel housing having an opening, said steel housing connecting with said steel pipe so that said steel housing opening is within said steel pipe; and
- a body fabricated from a non-steel material and positioned with said steel housing opening so that said body does not directly contact said steel pipe while being positioned within said steel pipe;

wherein said body being fixed relative to said steel pipe;

wherein said body having a plurality of substantially circular spaced apart apertures extending through said body; and wherein said body is fastened to said steel housing by a retainer ring.

18. A piping system, comprising:

a steel pipe; and a piping component releasably connected to said steel pipe, said piping component including:
- a steel housing having an opening, said steel housing connecting with said steel pipe so that said steel housing opening is within said steel pipe; and
- a body fabricated from a non-steel material and positioned with said steel housing opening so that said body does not directly contact said steel pipe while being positioned within said steel pipe;

wherein said body being fixed relative to said steel pipe;

wherein said body having a plurality of substantially circular spaced apart apertures extending through said body; and wherein said body is fastened to said steel housing by a key.

19. A piping system, comprising:

a steel pipe; and a piping component releasably connected to said steel pipe, said piping component including:
- a steel housing having an opening, said steel housing connecting with said steel pipe so that said steel housing opening is within said steel pipe; and
- a body fabricated from a non-steel material and positioned with said steel housing opening so that said body does not directly contact said steel pipe while being positioned within said steel pipe;

wherein said body being fixed relative to said steel pipe;

wherein said body having a plurality of substantially circular spaced apart apertures extending through said body; and wherein said body is fastened to said steel housing by a pin.

20. A flow conditioner chemically compatible with a fluid used in a steel pipe where steel containment is required, comprising:
- a substantially circular steel ring having a ring upstream face and a ring downstream face and having a substantially circular opening extending between said ring upstream face and said ring downstream face, wherein said ring upstream face and said ring downstream face being substantially flat; and
- a substantially circular body having a body upstream face and a body downstream face fabricated from a non-metal material that can withstand the fluid used in the steel pipe where steel containment is required and sized to be positioned with said ring opening, wherein one of said body faces being substantially flat;

wherein said body is fastened with said ring;

wherein said body having a plurality of substantially circular spaced apart apertures formed through said body in predetermined locations each in a substantially straight path between said body upstream face and said body downstream face; and wherein said body is fastened with said ring with an epoxy adhesive.

* * * * *